US012703483B2

(12) United States Patent
Mikic et al.

(10) Patent No.: US 12,703,483 B2
(45) **Date of Patent: *Aug. 11, 2026**

(54) INTEGRATED PROPULSION SYSTEM AND AIRCRAFT USING SAME

(71) Applicant: Joby Aero, Inc., Santa Cruz, CA (US)

(72) Inventors: Gregor Veble Mikic, Santa Cruz, CA (US); JoeBen Bevirt, Santa Cruz, CA (US)

(73) Assignee: Joby Aero, Inc., Santa Cruz, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/039,569

(22) Filed: Jan. 28, 2025

(65) Prior Publication Data

US 2025/0171137 A1 May 29, 2025

Related U.S. Application Data

(63) Continuation of application No. 18/218,100, filed on Jul. 4, 2023, now Pat. No. 12,280,868.

(60) Provisional application No. 63/358,532, filed on Jul. 6, 2022.

(51) Int. Cl.

| | |
|---|---|
| ***B64C 29/00*** | (2006.01) |
| ***B64C 3/18*** | (2006.01) |
| ***B64C 5/02*** | (2006.01) |
| ***B64C 9/16*** | (2006.01) |

(52) U.S. Cl.

CPC .......... *B64C 29/0008* (2013.01); *B64C 3/185* (2013.01); *B64C 5/02* (2013.01); *B64C 9/16* (2013.01); *B64C 29/0025* (2013.01)

(58) Field of Classification Search

CPC .............. B64C 29/005; B64C 29/0008; B64C 29/0016; B64C 29/0025; B64C 29/0041; B64C 29/0066

See application file for complete search history.

(56) References Cited

U.S. PATENT DOCUMENTS

| | | | | |
|---|---|---|---|---|
| 4,301,980 A * | 11/1981 | Bradfield | B64C 29/0066 | 244/55 |
| 4,767,083 A * | 8/1988 | Koenig | B64C 21/025 | 244/12.3 |
| 9,346,542 B2 * | 5/2016 | Leng | B64D 31/12 | |
| 11,597,509 B1 * | 3/2023 | Alfaro | B64C 29/0025 | |
| 2011/0168835 A1 * | 7/2011 | Oliver | B64D 27/06 | 244/12.4 |

(Continued)

*Primary Examiner* — Richard G Davis

(74) *Attorney, Agent, or Firm* — Michael A. Guth

(57) ABSTRACT

A vertical take-off and landing aircraft with a multi-element lifting system with integrated propulsion. The multi-element lifting system may have an upper wing element, a lower wing element, and a control wing element which is located below the upper wing element and above, and rearward of, the lower wing element. The system uses internal propulsion units, such as internal ducted fans, which flow air below the upper wing element and above the lower wing element such that the air flows through the multi-element lifting system. The control wing element may be articulated to route air vertically downward to allow for short or vertical take-off and landing. An aircraft with a multi-element wing assembly and a multi-element tail assembly raised above the wing assembly. An aircraft which resides on the ground with the wing assembly and the tail assembly pitched up.

13 Claims, 27 Drawing Sheets

(56) References Cited

U.S. PATENT DOCUMENTS

| | | | | |
|---|---|---|---|---|
| 2014/0158816 | A1* | 6/2014 | DeLorean | B64D 27/355 244/12.4 |
| 2017/0203839 | A1* | 7/2017 | Giannini | B64U 50/33 |
| 2020/0331589 | A1* | 10/2020 | Cummings | B64D 27/32 |
| 2021/0323662 | A1* | 10/2021 | Giurca | B64C 29/0025 |
| 2022/0267017 | A1* | 8/2022 | Pitre | B64C 29/0033 |

* cited by examiner

INTEGRATED PROPULSION SYSTEM AND AIRCRAFT USING SAME

CROSS-REFERENCE TO RELATED APPLICATIONS

This application is a continuation of U.S. patent application Ser. No. 18/218,100 to Mikics et al., filed Jul. 4, 2023, which claims priority to U.S. Provisional Patent Application No. 63/358,532 to Mikic et al., filed Jul. 6, 2022, which are hereby incorporated by reference in their entirety.

FIELD OF THE INVENTION

This invention relates to aerial vehicles, including an aerial vehicle with a multi-element lifting system with an integrated propulsion.

SUMMARY

Figure 1:
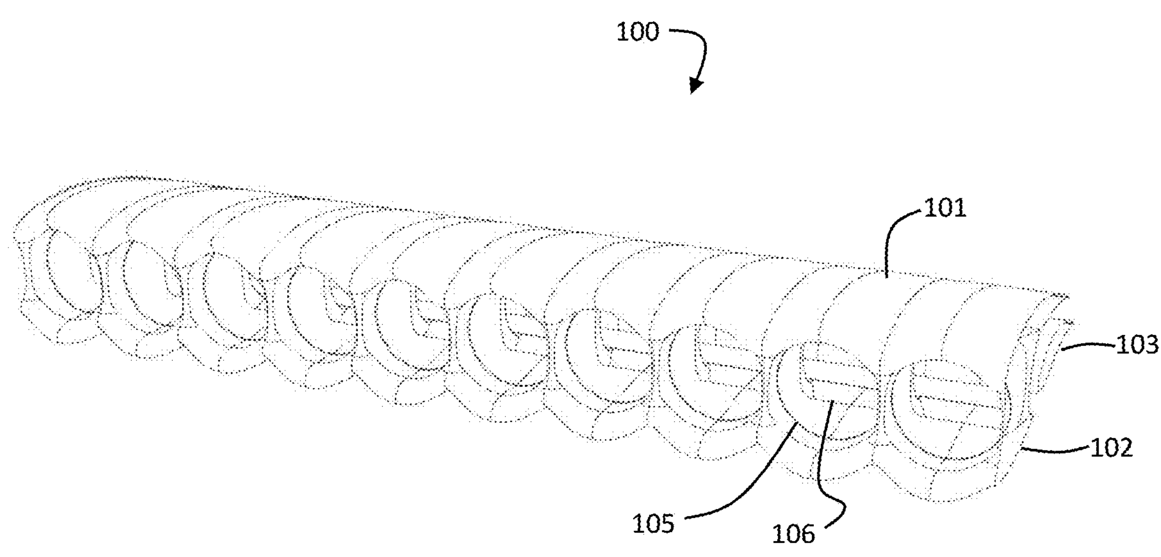
FIG. 1 is a front raised perspective view of a multi-element lifting system according to some embodiments of the present invention.
Figure 2:
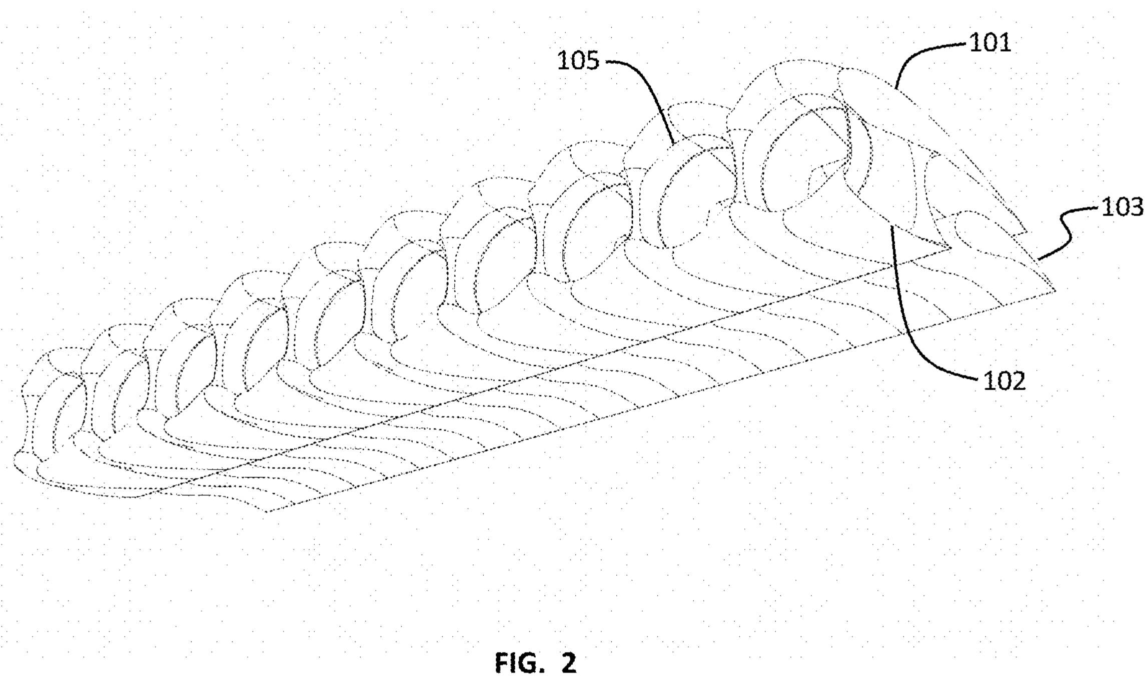
FIG. 2 is a front lowered perspective view of a multi-element lifting system according to some embodiments of the present invention.

A vertical take-off and landing aircraft with a multi-element lifting system with integrated propulsion. The multi-element lifting system may have an upper wing element, a lower wing element, and a control wing element which is located below the upper wing element and above, and rearward of, the lower wing element. The system uses internal propulsion units, such as internal ducted fans, which flow air below the upper wing element and above the lower wing element such that the air flows through the multi-element lifting system. The control wing element may be articulated to route air vertically downward to allow for short or vertical take-off and landing. An aircraft with a multi-element wing assembly and a multi-element tail assembly raised above the wing assembly. An aircraft which resides on the ground with the wing assembly and the tail assembly pitched up.

DETAILED DESCRIPTION

In some embodiments of the present invention, an aerial vehicle adapted for vertical take-off and landing uses a combined wing and integrated propulsion system. The wings have upper and lower elements with thrust units residing below the upper wing element and above the lower wing element. The multi-element wing further comprises a control wing element which resides behind the thrust unit and is adapted to be controllable into different positions, including a VTOL configuration where the thrust is deflected downward. The control wing element provides significant lift in a forward flight configuration, although separate from the upper and lower wing elements.

In some aspects, an aerial vehicle according to embodiments of the present invention may have a second, or third or more, combined wing and integrated propulsion system such as a horizontal rear tail wing, or a forward canard. In some aspects, the combined wings and integrated propulsion systems are staggered in elevation such that ingested airflow into the rearward thrust units from the forward thrust units is reduced or eliminated.

In some aspects, there is a single wing with a significant amount of sweep, such that there are thrust units providing vertical thrust in the hover configuration both fore and aft of the center of mass of the aircraft.

In some aspects, the aerial vehicle may be configured such that the landed, on the ground, configuration has the wings tilted upward, in that the fuselage has its nominal horizontal flight roll axis pitched up while on the ground. This configuration may provide an advantage in that the risk of debris ingestion is lowered, and also that the hover mode may not require the control wing element to be articulated to a full 90 degrees (or more).

In some aspects, the thrust units may be powered by electric motors. The aircraft may have batteries adapted to provide electric power to the motors. In some aspects, the electric power on the aerial vehicle may come from both batteries and from other sources, such as one or more fuel cells. In some aspects, the high discharge rates associated with the hover mode in VTOL operations may require that batteries be used to support hover mode operations, and then in a forward flight mode fuel cells may be used due to the lower instantaneous demands for power.

In some embodiments of the present invention, a multi-element lifting system with integrated propulsion 100 allows for both forward flight configurations and vertical take-off and landing configurations, as well transitions therebetween. As seen in FIGS. 1-8 in a forward flight configuration 100*a*, the multi-element lifting system 100 comprises an upper wing element 101 and a lower wing element 102. A control wing element 103 resides rearward of the thrust elements below the upper wing element 101. The multi-element lifting system 100 can be viewed as comprising a plurality of side by side wing segments 104, each of which have front opening 105, which may be circular in some aspects.

Figure 5:
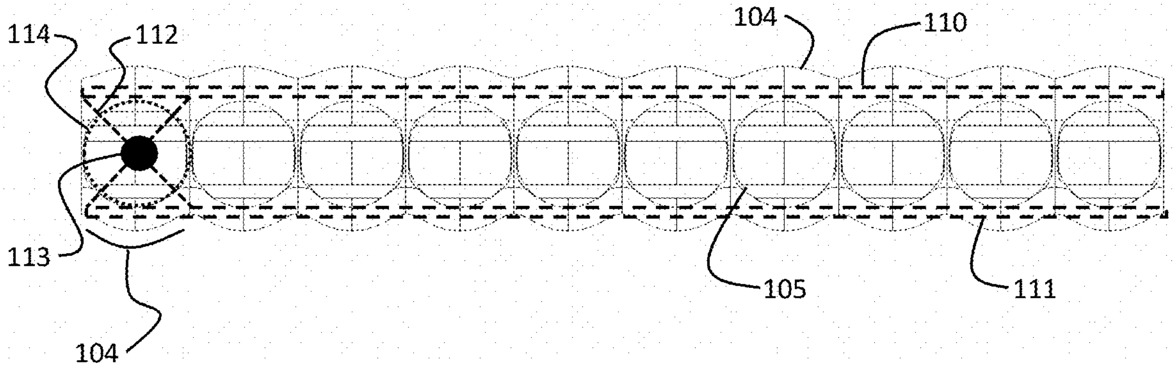
FIG. 5 is a front view of a multi-element lifting system according to some embodiments of the present invention.

As seen in FIG. 5, a wing segment 104 may contain a motor 113 which drives a thrust unit, which may be an internal ducted fan assembly 140 with a disc plane 114. In some aspects, the ducted fan assembly stator may have stator vanes. In some aspects, the vanes are a plurality of radial vanes. In some aspects, the vanes are radial vanes with one or more circular vanes. In an exemplary embodiment, the fan diameter may be 0.3 meters. The multi-element lifting system may have an upper spar 110 and a lower spar 111 which traverse through the wing segments 104 to provide structural strength and rigidity to the lifting system. The motor 113 may be mounted to braces, or cross-braces 112, which may be structurally coupled to the spars 110, 111. In some aspects, the braces may be included to function as the stator vanes. Although illustrated in FIG. 5 with just one wing segment 104 containing a motor 113 and disc plane 114, it is to be understood that each of the wing segments 104 would have a thrust unit.

Figure 3:
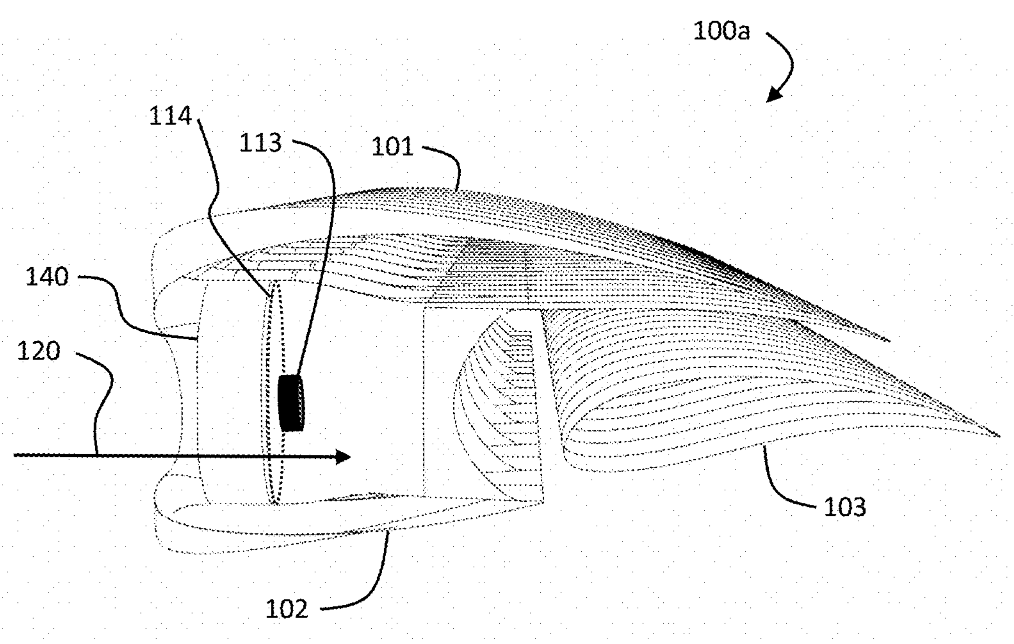
FIG. 3 is a side cross-sectional view of a multi-element lifting system according to some embodiments of the present invention.
Figure 4:
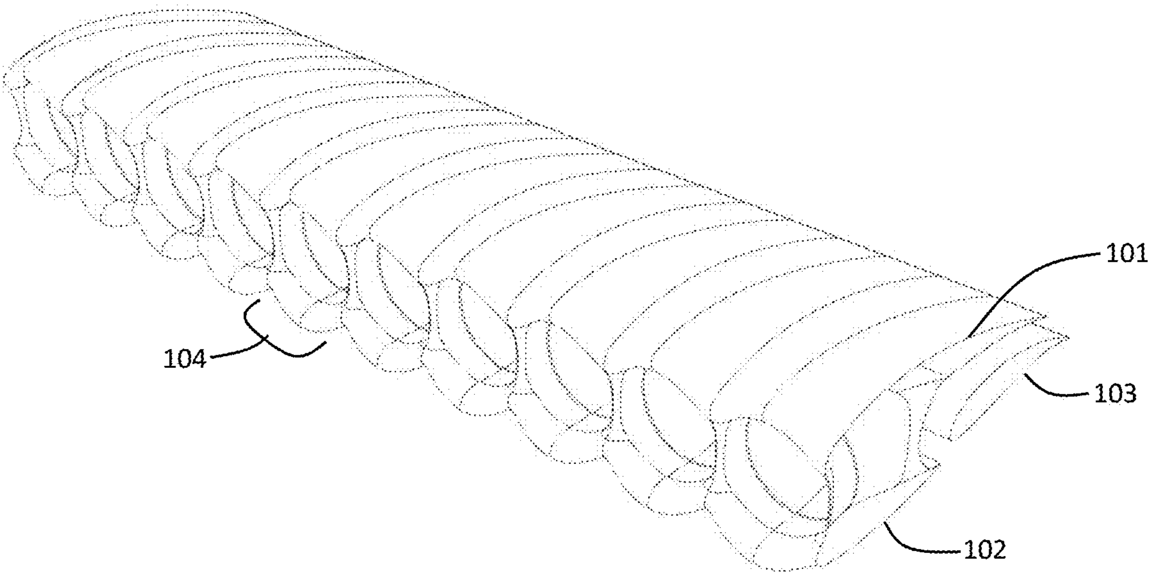
FIG. 4 is a raised front perspective view of a multi-element lifting system according to some embodiments of the present invention.

As seen in cross-sectional side view in FIG. 3, airflow 120 through the front opening 105 will flow below the upper wing element 101 and above the lower wing element 102. The motor 113 rotates a thrust element, with the disc plane 114 rearward of the front opening 105. In some aspects, the ducted fan assembly stator may have stator vanes. In some aspects, the vanes are a plurality of radial vanes rearward of the thrust element. In some aspects, the vanes are radial vanes with one or more circular vanes. The front opening 105 may be substantially circular, while the rear exit area may be substantially rectangular, or square. A control wing element 103 resides rearward of the thrust elements below the upper wing element 101. The control wing element 103 is a detached element which provides significant lift in forward flight. The control wing element 103 helps to regulate the airflow through the system, may act as a flow restrictor for the velocity through the thrust element, which also will reduce the drag around the mechanisms, as well as the drag of the internal walls of the airflow chamber, and the stator and stator vanes, and which will support and articulate the control wing element. Although described herein as a multi-element lifting system with three wing elements, the system could be viewed as a wing with integrated propulsion and internal airflow, with a trailing control element.

Figure 7:
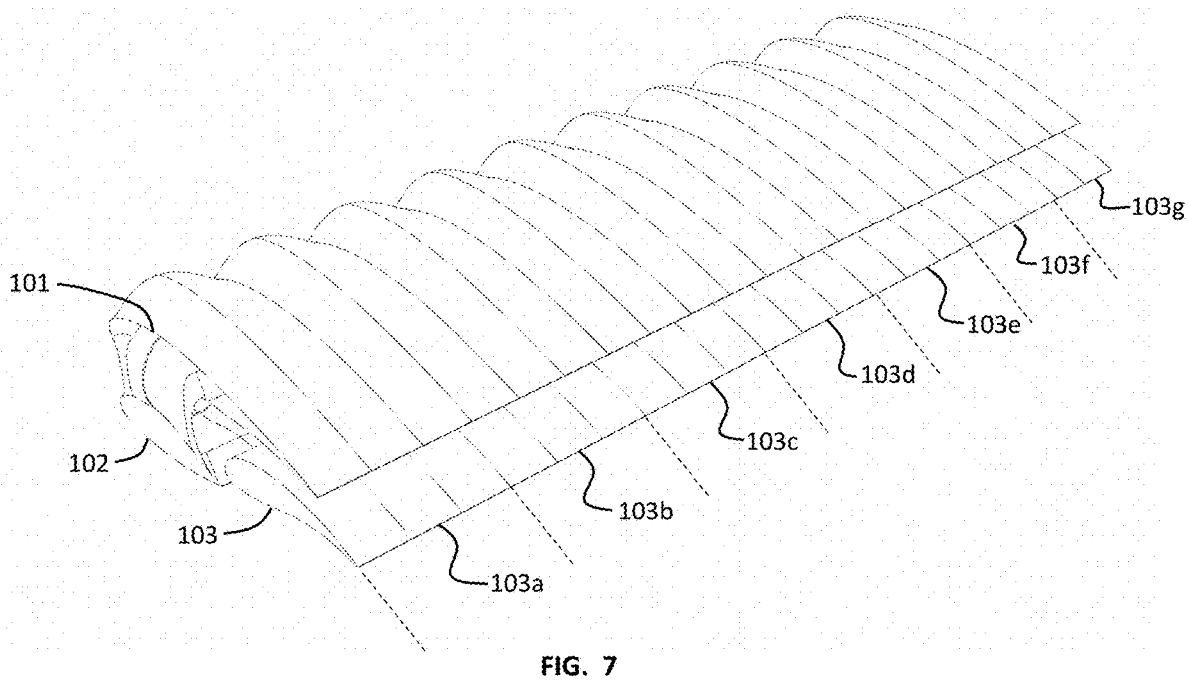
FIG. 7 is a rear raised perspective view of a multi-element lifting system according to some embodiments of the present invention.
Figure 8:
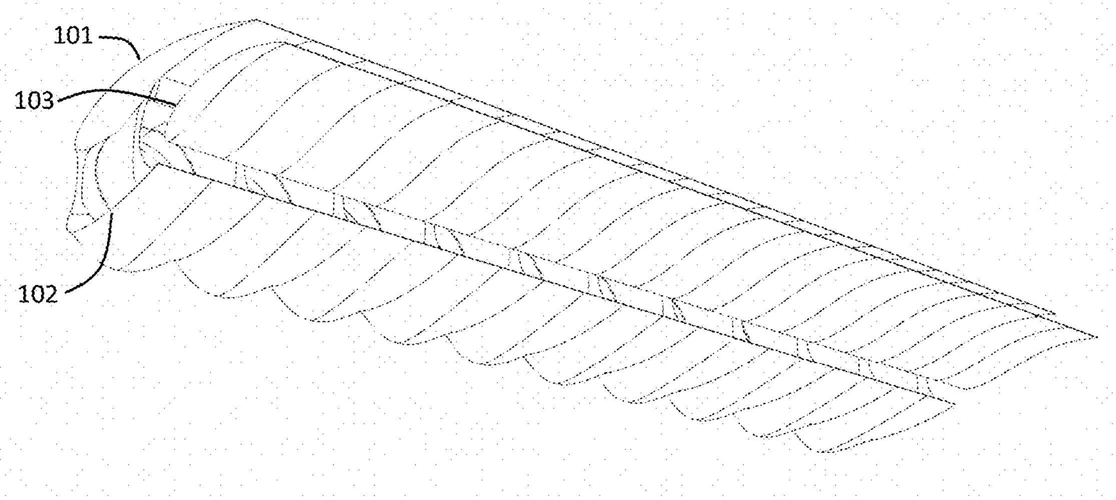
FIG. 8 is lower rear perspective view of a multi-element lifting system according to some embodiments of the present invention.

In some aspects, the control wing element is a singular element which traverses the length of the wing, and all of the control wing element is positioned uniformly along the length of the wing. In some aspects, there is a separate control wing element segments for each of the thrust elements, and each control wing element segment is individually controllable. In an illustrative embodiment, as seen in FIG. 7, each control wing element segment traverses up to three thrust units, with each of these control wing element segments 103*a*, 103*b*, 103*c*, 103*d*, 103*e*, 103*f*, 103*g* individually controllable to a desired angular position. The thrust units together with control wing segment deflections allow for variation of both the magnitude as well as direction of thrust in all flight regimes. Furthermore, even in absence of thrust, in forward flight, the movement of the control wing segment affects the lift on that wing section in the way a traditional control surface on an aircraft does. This allows for aircraft to have full control of all angular axes of flight without additional control elements. In some aspects, the aerial vehicle 300, 400, 500 does not have controllable control elements other than the control wing segments.

In hover, changing the angle of the control wing segments will change the direction of thrust. This allows for yaw control in hover. Differential thrust along the longitudinal axis allows for pitch control, differential thrust along the lateral axis for roll control. Collective movement of the control wing segments will create a forward/rearward thrust that allows the aircraft to accelerate/decelerate, and this can be combined with overall aircraft pitching motion close to hover to achieve acceleration/deceleration.

In forward flight, differential control wing segment deflection along the longitudinal axis creates a longitudinal distribution of lift that gives pitch control. Differential control wing segment deflection along the lateral axes creates a lift distribution gives roll control. Thrust distribution along the lateral axis gives yaw control. For regimes of flight between hover and forward flight, a blend of the above strategies is effective.

The thrust units together with control wing segment deflections allow for variation of both the magnitude as well as direction of thrust in all flight regimes. Furthermore, even in absence of thrust, in forward flight, the movement of the control wing segment affects the lift on that wing section in the way a traditional control surface on an aircraft does. This allows for aircraft to have full control of all angular axes of flight without additional control elements. In some aspects, the aerial vehicle 300, 400, 500 does not have controllable control elements or surfaces other than the control wing segments.

Figure 6:
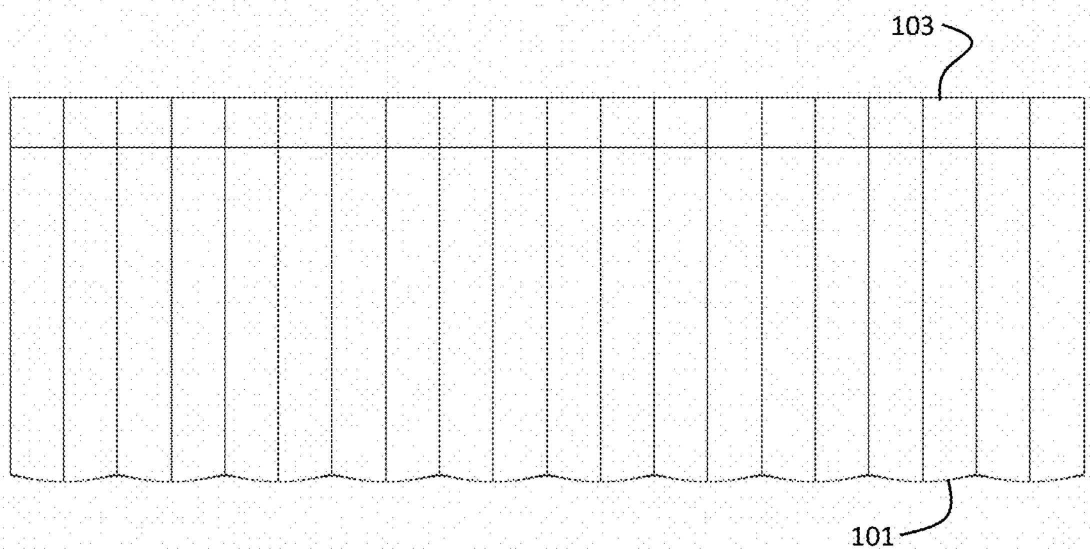
FIG. 6 is a top view of a multi-element lifting system according to some embodiments of the present invention.
Figure 9:
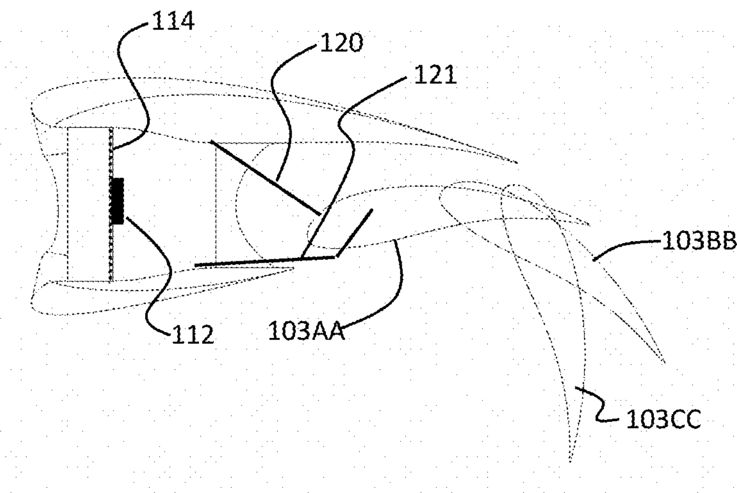
FIG. 9 is a side view of different configurations of a multi-element lifting system according to some embodiments of the present invention.
Figure 10:
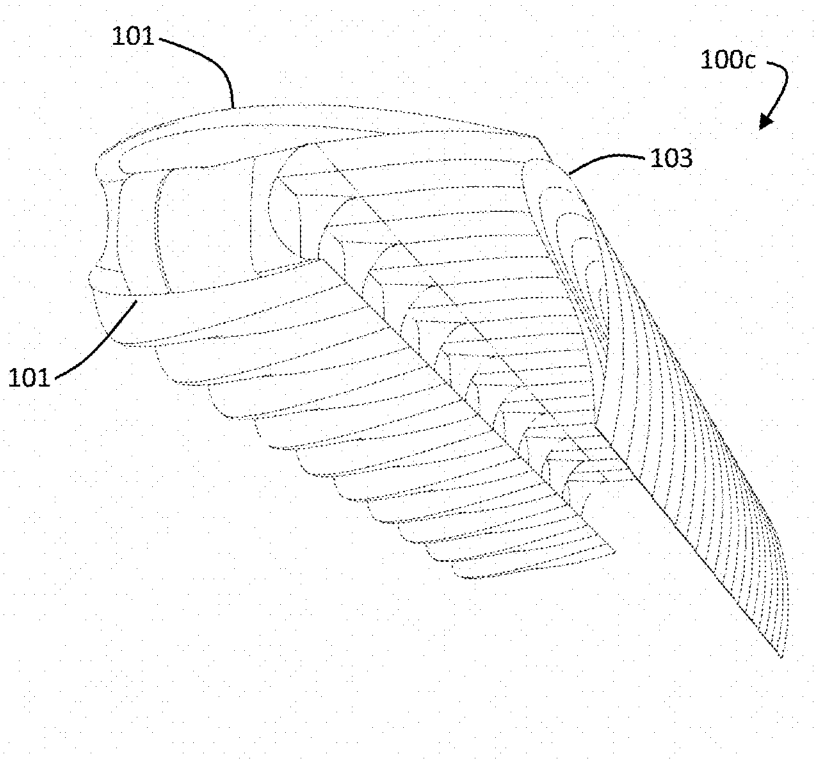
FIG. 10 is a side perspective view of a multi-element lifting system in a vertical flight configuration according to some embodiments of the present invention.
Figure 11:
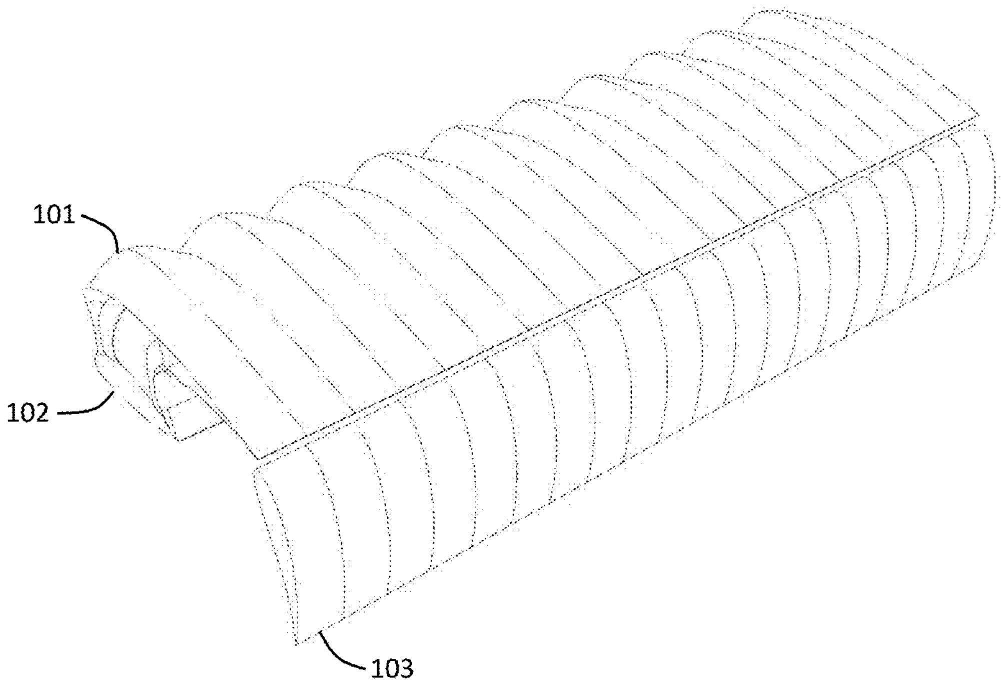
FIG. 11 is a raised rear perspective view of a multi-element lifting system in a vertical flight configuration according to some embodiments of the present invention.
Figure 12:
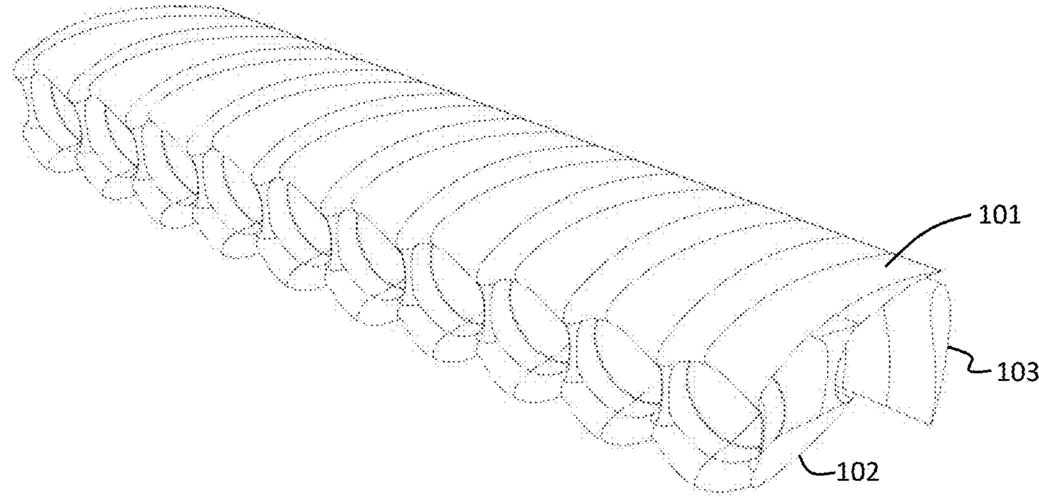
FIG. 12 is a front perspective view of a multi-element lifting system in a vertical flight configuration according to some embodiments of the present invention.
Figure 13:
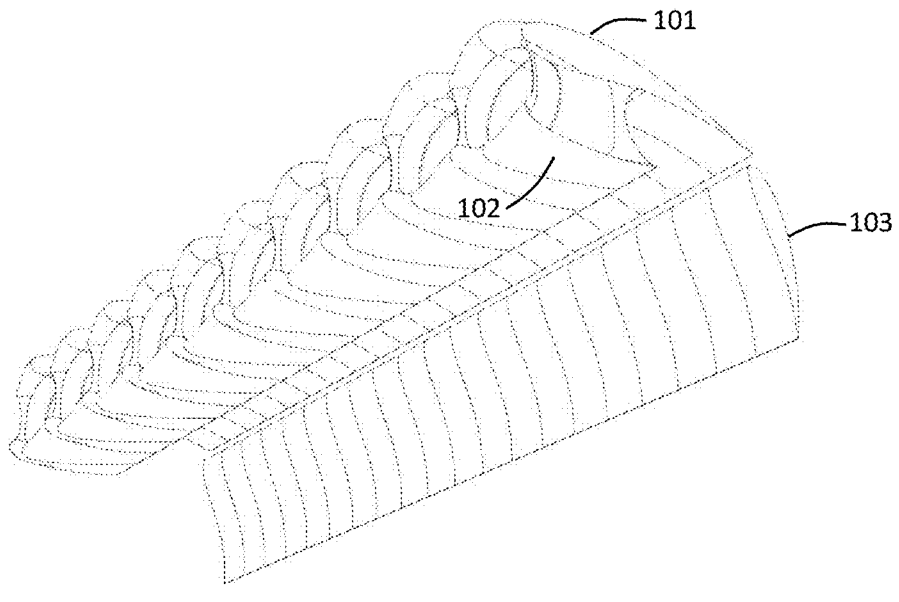
FIG. 13 is a lowered perspective view of a multi-element lifting system in a vertical flight configuration according to some embodiments of the present invention.
Figure 14:
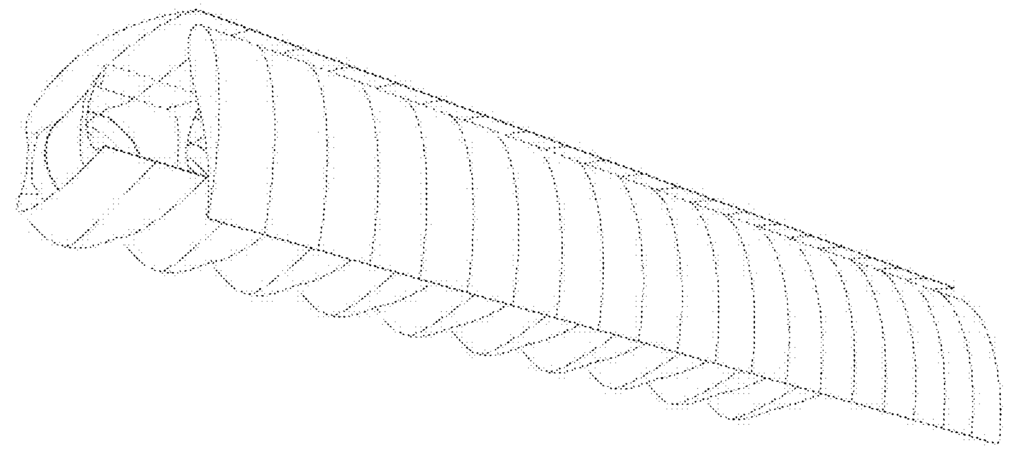
FIG. 14 is a side perspective view of a multi-element lifting system in a vertical flight configuration according to some embodiments of the present invention.

The control wing element 103 may extend rearward of the upper wing element in the forward flight configuration 100*a*, as seen in top view in FIG. 6. As seen in a cross-sectional side view in FIG. 9, the control wing element may reside in a forward flight position 103*a*, transition through an intermediate position 103*b*, and continue out to a vertical take-off and landing position 103c. A set of mechanized articulating linkages 120, 121 may be used to deploy the control wing element to the different positions. In an illustrative embodiment, the vertical distance of the air passage rearward of the thrust element in a wing segment may be approximately the same as the horizontal distance from the rearward end of the lower wing segment to the control wing segment while in the vertical configuration 103c.

FIGS. 10-14 illustrate the multi-element lifting system 100 in a vertical take-off and landing configuration 100c according to some embodiments of the present invention. In this configuration, the airflow from the thrust elements is deflected downwards to provide vertical thrust. The upper wing element 101 resides above the lower wing element 102. Airflow into the front opening 105 of the wing segment 104 travels through the ducted fan assembly 140 and is then deflected by the control element 103. The control element 103, when in the hover configuration 103c, deflects the thrust downwards, which allows for vertical take-off, landing, and hover of the aerial vehicle.

Figure 15:
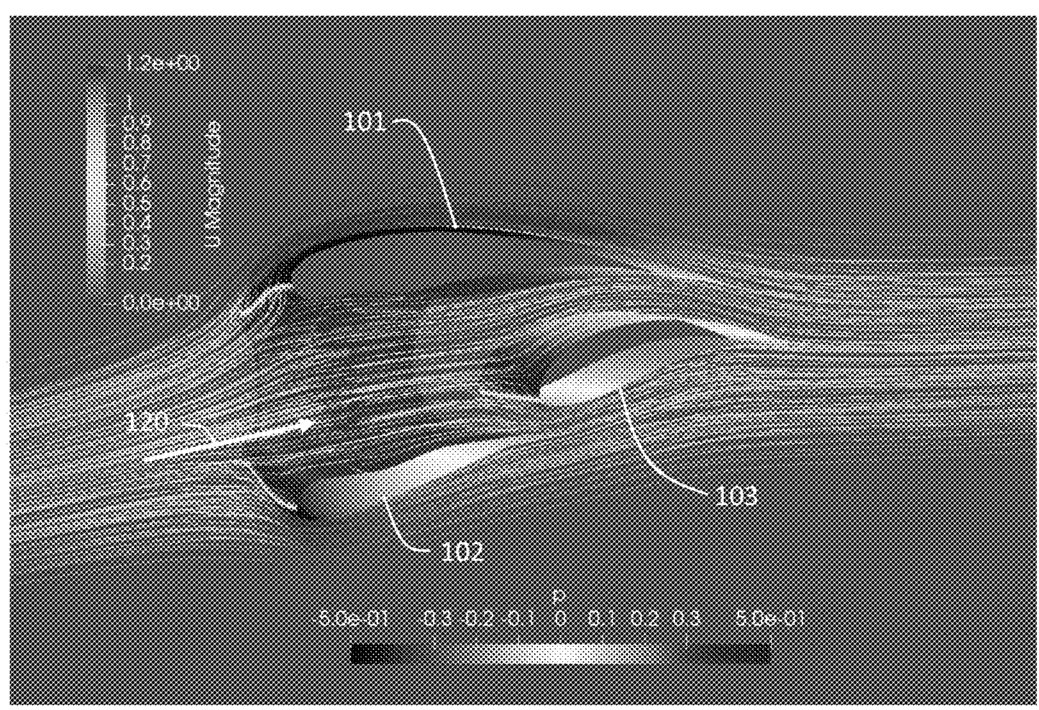
FIG. 15 is an illustration of velocity and pressure distributions in a multi-element lifting system with integrated propulsion according to some embodiments of the present invention.
Figure 16:
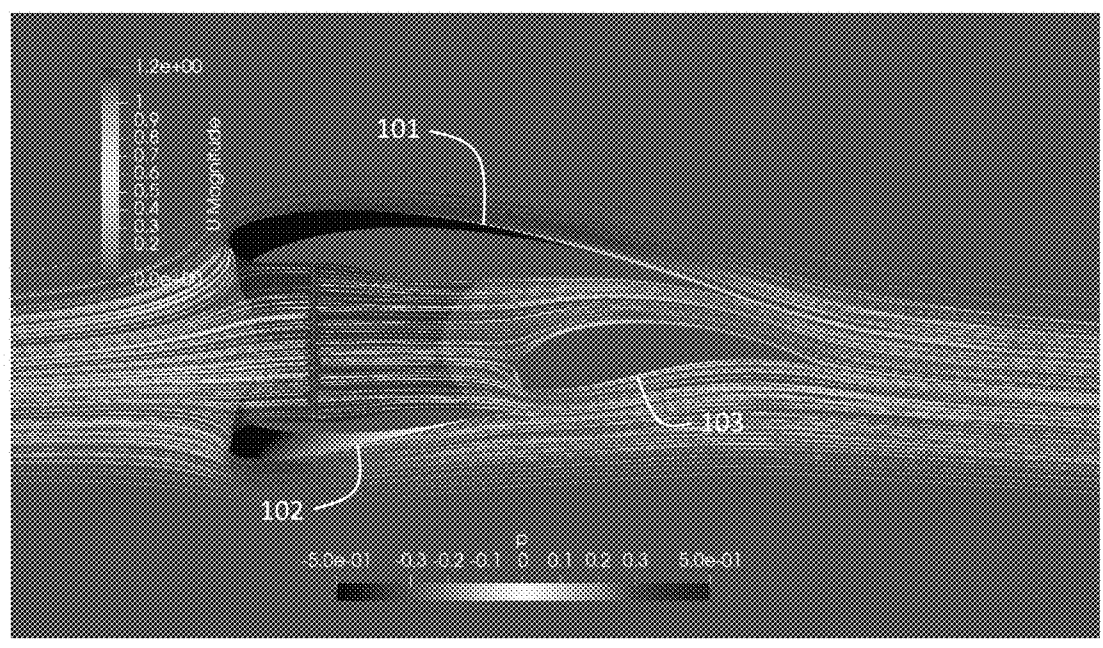
FIG. 16 is an illustration of velocity and pressure distributions in a multi-element lifting system with integrated propulsion according to some embodiments of the present invention.

FIGS. 15 and 16 show a simulated section of the wing in forward flight. The airflow 120 enters between the upper wing element 101 and the lower wing element 102. One can observe the throttling action of the control wing element 103 that restricts the flow. The streamlines are partially deflected around the inlet area, and a smaller subset of streamlines enters the duct at a reduced velocity (seen here as significantly below the freestream velocity of 1, here around 0.3, which could be higher or lower in some aspects) and with strong pressure recovery (the duct is almost at dynamic pressure, the value of dynamic pressure shown here is 0.5). In some aspects, the reduced velocity of the streamlines entering the duct are at a velocity of below 0.7 of the freestream velocity. In some aspects, the reduced velocity of the streamlines entering the duct are at a velocity of below 0.6 of the freestream velocity. In some aspects, the reduced velocity of the streamlines entering the duct are at a velocity of below 0.5 of the freestream velocity. In some aspects, the reduced velocity of the streamlines entering the duct are at a velocity of below 0.4 of the freestream velocity. The regulation of flow velocity in the duct reduces the losses due to fan installation (mounts, cooling, etc.) and the inner walls, at some expense of increased skin friction losses as the speeds on the upper and lower surface are increased. Regulation of flow also allows the fan to operate at its best operating point of its rotational speed and flow speed through the duct. Flow is then smoothly accelerated when passing the control wing towards freestream pressure.

Figure 17:
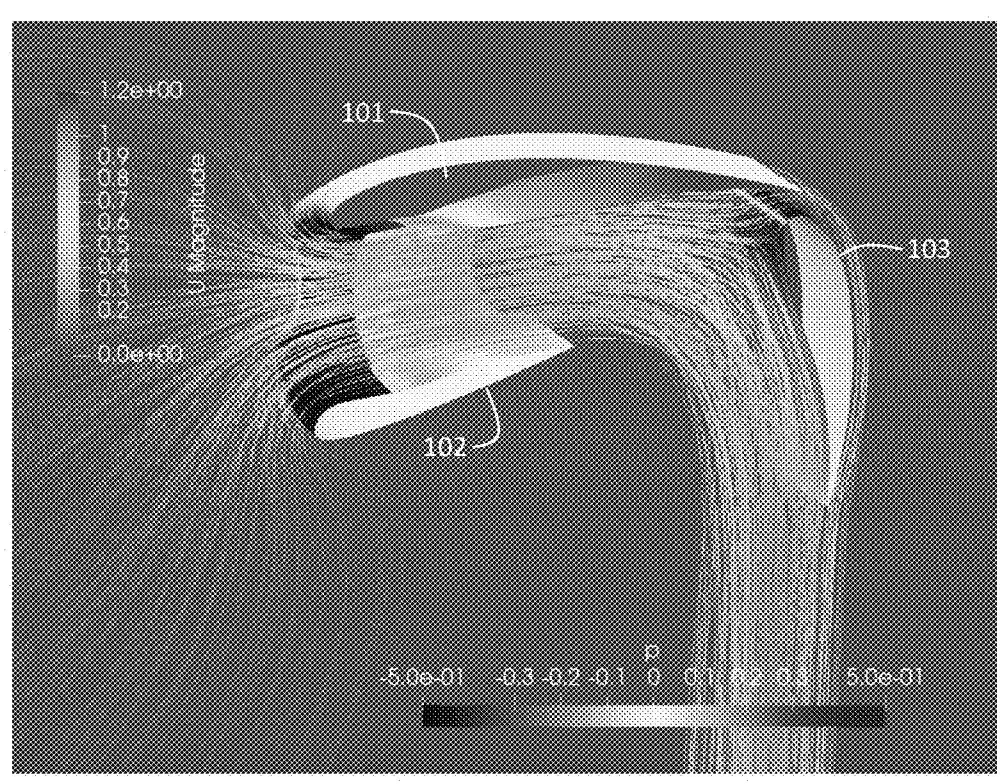
FIG. 17 is an illustration of velocity and pressure distributions in a multi-element lifting system with integrated propulsion in a vertical flight configuration according to some embodiments of the present invention.
Figure 18:
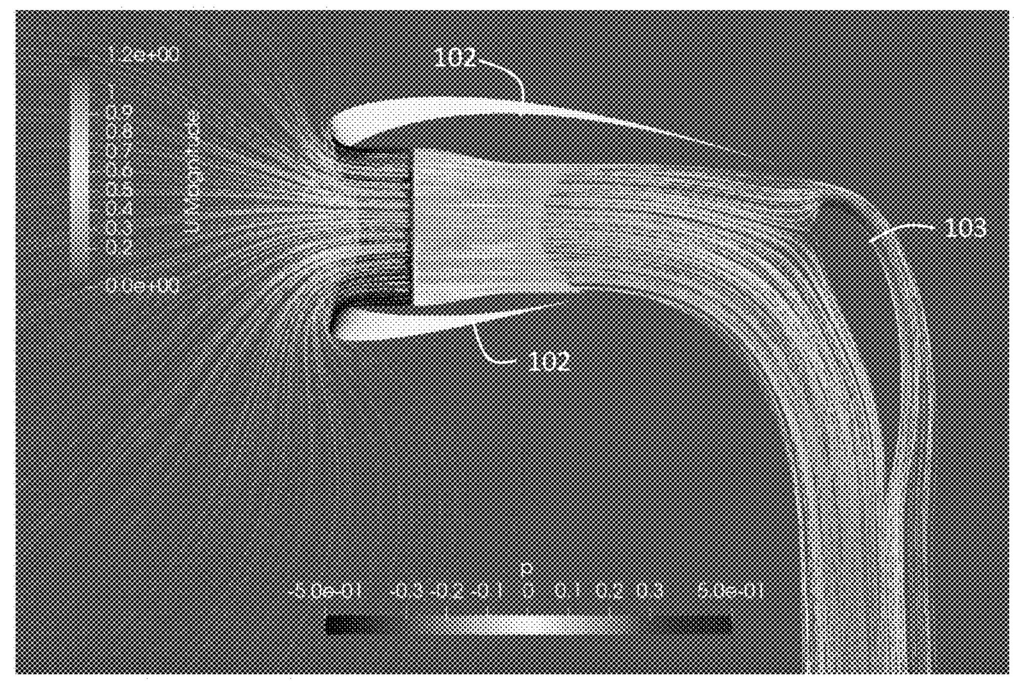
FIG. 18 is an illustration of velocity and pressure distributions in a multi-element lifting system with integrated propulsion in a vertical flight configuration according to some embodiments of the present invention.

FIGS. 17 and 18 show a simulated section of the wing and fan at hover condition, with the fan modeled as a pressure jump. The control wing acts as a deflecting element that turns the flow downwards. The separation between the control wing and the outlet from the duct allows for alleviation of backpressure into the duct, which ensures that the effective cross section area of the outgoing stream of air remains as large as possible compared to the disk area, which provides as high an effective disk loading and hover figure of merit as possible. The alleviation of back pressure is reflected in the fact that the flow velocity through the duct and the deflected jet velocity after it passes the control wing are very similar. There is also a gap between the control wing and the upper element of the wing, which allows for some of the jet pass through the gap and be turned vertically by the upper/rearwards side of the control wing. This helps further alleviate the back pressure as turning is achieved not only be the pressure side of the control wing but also suction of the control wing. One can also notice the suction at the leading edge of the duct, as expected from a good ducted fan installation where about as much thrust is generated by the inlet as there is by the fan in an ideal scenario.

In some embodiments of the present invention, as seen in FIGS. 19A-J, an aerial vehicle 300 has a vehicle main body has a front wing assembly coupled to an upper portion of the aerial vehicle 300. The front wing assembly has a right side wing assembly 302 and a left side wing assembly 303. A right side wing assembly 302 uses the multi-element lifting system and is coupled to the vehicle main body 301. A left side wing 303 uses the multi-element lifting system and is coupled to the vehicle main body 301. The aerial vehicle may have a rear wing assembly in the position of a rear horizontal stabilizer 304 and have rear stabilizer extensions 305 at the outboard ends of the rear wing assembly, which may function in part as vertical stabilizers. The multi-element lifting systems may take on the function of wings on the aerial vehicle, with internal airflow from thrust elements in each of the wing segments. A control wing segment resides near the rear of each system/wing, as described above. In some aspects, there may be other control features or thrust units on the aerial vehicle.

Figure 19A:
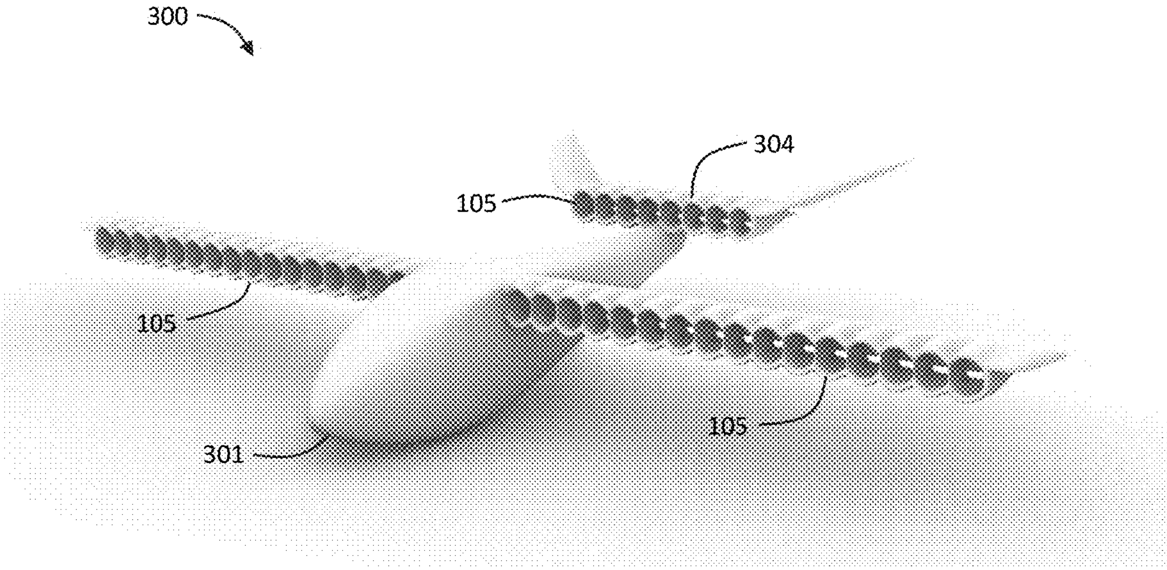
FIGS. 19A-J are views of a first embodiment of an aircraft with a multi-element lifting system with integrated propulsion according to some embodiments of the present invention.
Figure 19B:
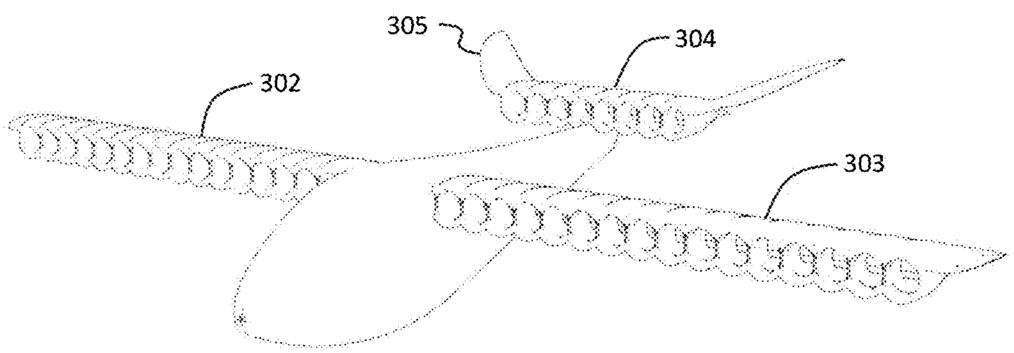
Figure 19C:
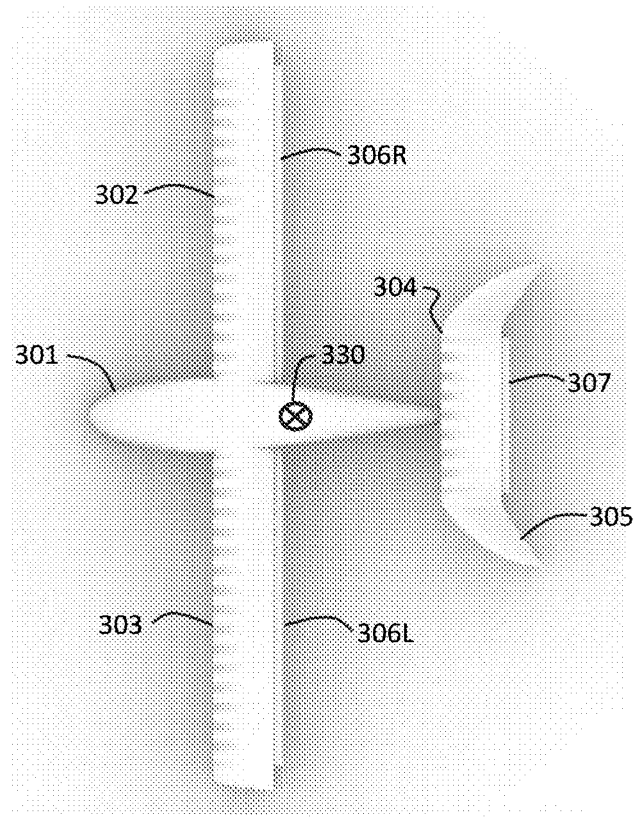
Figure 19D:
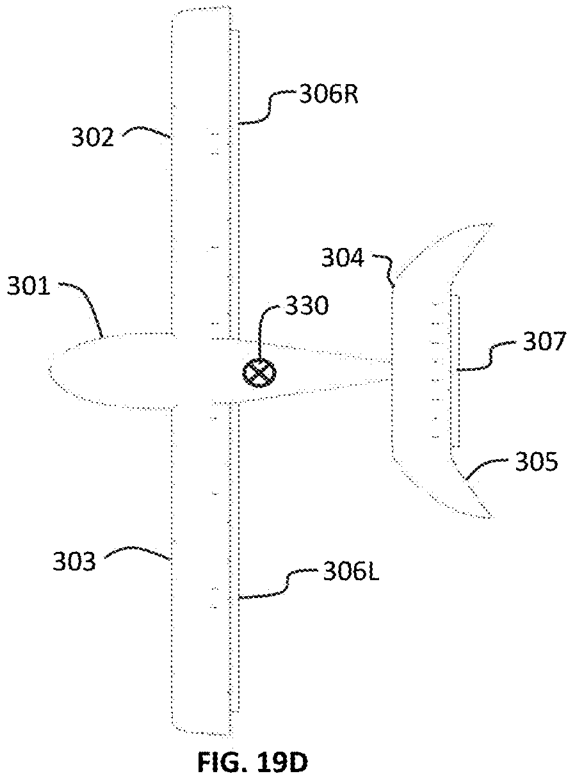
Figure 19E:
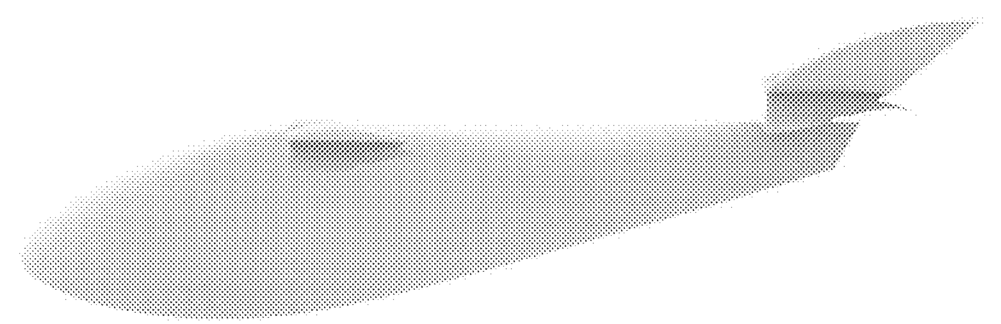

The right wing assembly 302 of the aerial vehicle 300 has a control wing segment 306R which can be seen extending rearward from the upper wing element of the wing assembly, in FIG. 19C, for example. The left wing assembly 303 of the aerial vehicle 300 has a control wing segment 306L which can be seen extending rearward from the upper wing element of the wing assembly. The right wing assembly 302 and the left wing assembly 303 have a plurality of front openings 105. Airflow through the front opening 105 will flow below the upper wing element 101 and above the lower wing element 102. The motor 113 rotates a thrust element, with the disc plane 114 rearward of the front opening 105. The front opening 105 may be substantially circular, while the rear exit area may be substantially rectangular, or square. The control wing elements 306R, 306L may reside in a forward flight position during forward flight, during which the control wing element may be in a horizontal orientation. The control wing elements are adapted to transition through intermediate positions, and out to a vertical take-off and landing position during hover flight, during which the control wing element may be deflecting the airstream into a substantially vertical, downward, direction.

The rear wing assembly 304 of the aerial vehicle 300 has a control wing segment 307 which can be seen extending rearward from the upper wing element of the rear wing assembly, in FIG. 19C, for example. Airflow through the front opening 105 will flow below the upper wing element 101 and above the lower wing element 102. The motor 113 rotates a thrust element, with the disc plane 114 rearward of the front opening 105. The front opening 105 may be substantially circular, while the rear exit area may be substantially rectangular, or square. The control wing element 307 may reside in a forward flight position during forward flight, during which the control wing element may be in a horizontal orientation. The control wing element is adapted to transition through intermediate positions, and out to a vertical take-off and landing position during hover flight, during which the control wing element may be deflecting the airstream into a substantially vertical, downward, direction. The aerial vehicle center of mass 330 resides between the front wing assembly and the rear wing assembly, allowing for control of the aerial vehicle during VTOL hover operations.

Figure 19F:
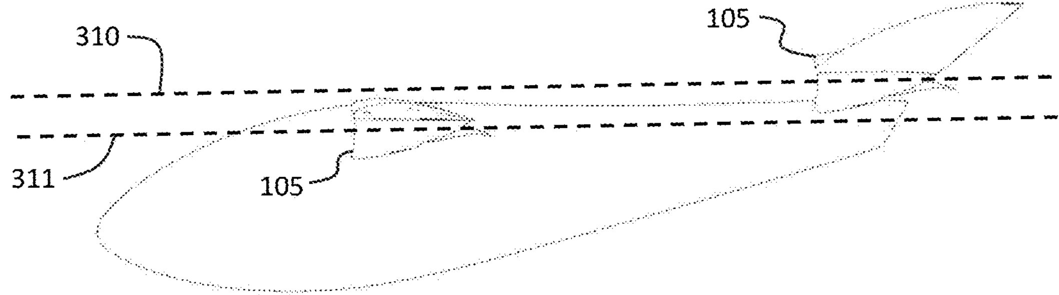
Figure 19G:
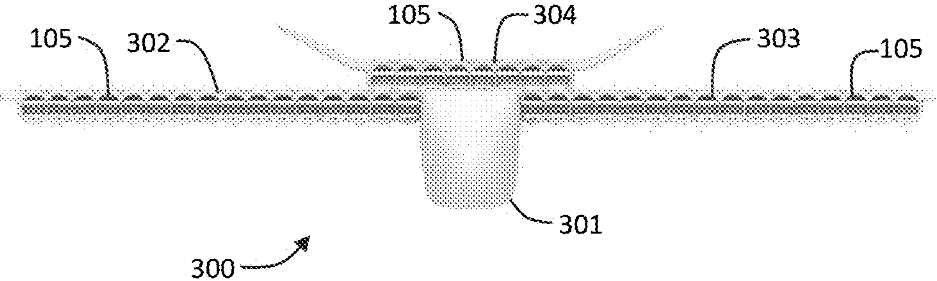
Figure 19H:
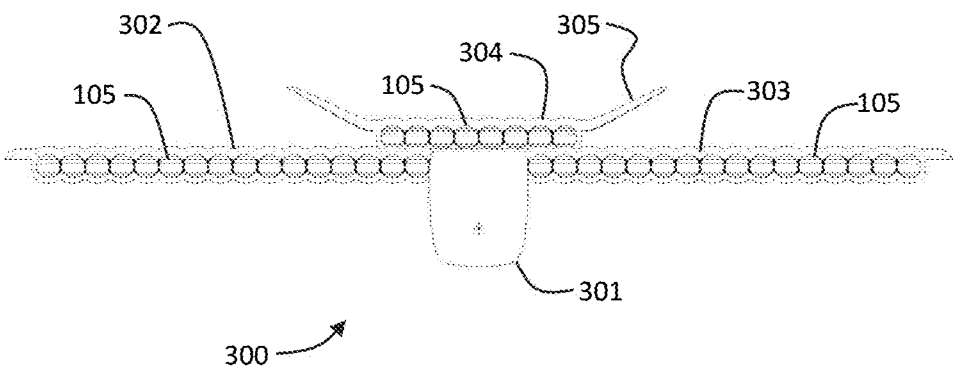
Figure 19I:
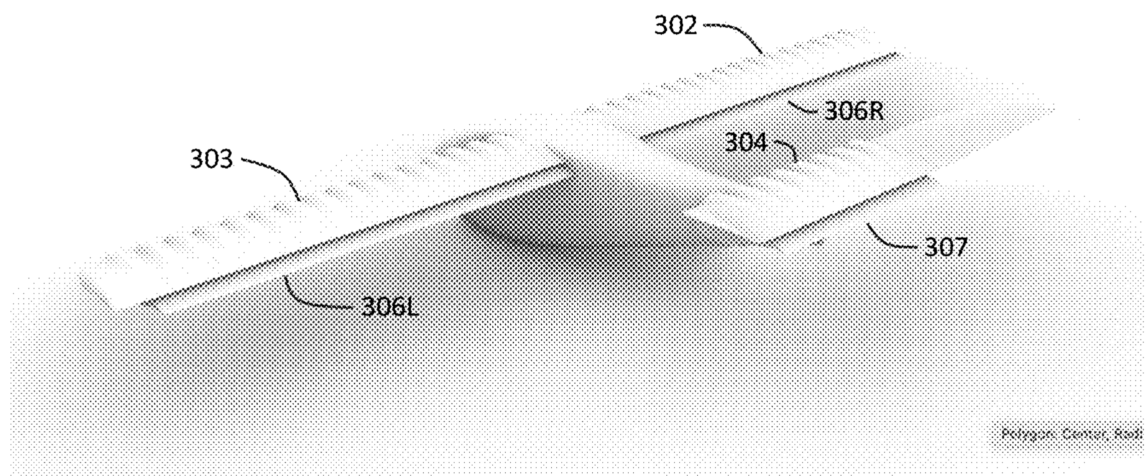
Figure 19J:
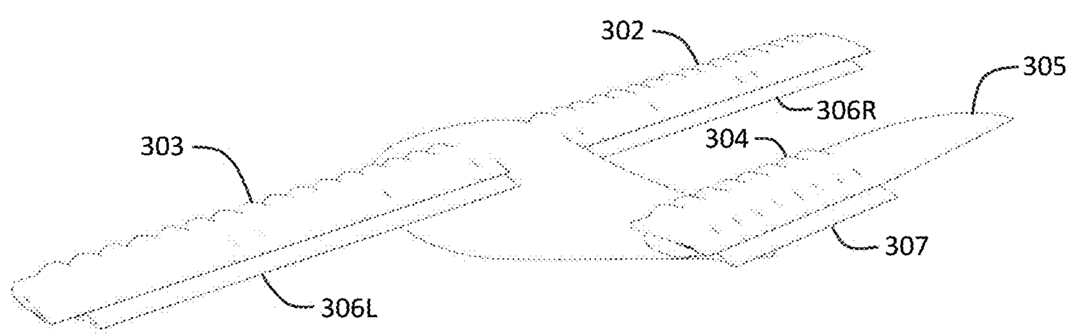

As can be seen in side view in FIG. 19F, the nominal airflow elevation 310 through the front wing assembly 302,

303 is at a different elevation than the nominal airflow elevation 311 through the rear wing assembly 304. In this illustrative embodiment, the nominal airflow elevation 311 through the rear wing assembly 304 is higher than that of the front wing assembly.

In some aspects, the aerial vehicle may utilize batteries with a high discharge rate for VTOL modes, while using fuel cells for long range forward flight.

In some embodiments of the present invention, as seen in FIGS. 20A-H, an aerial vehicle 400 has a vehicle main body and has a front wing assembly coupled to an upper portion of the aerial vehicle 300. The front wing assembly has a right side wing assembly 402 and a left side wing assembly 403. A right side wing assembly 402 uses the multi-element lifting system and is coupled to the vehicle main body 401. A left side wing 403 uses the multi-element lifting system and is coupled to the vehicle main body 401. The aerial vehicle may have a rear wing assembly in the position of a rear horizontal stabilizer 404 and have downward flaring rear stabilizer extensions 405 at the outboard ends of the rear wing assembly, which may function in part as vertical stabilizers. The multi-element lifting systems may take on the function of wings on the aerial vehicle, with internal airflow from thrust elements in each of the wing segments. A control wing segment resides near the rear of each system/wing, as described above. In some aspects, there may be other control features or thrust units on the aerial vehicle.

Figure 20A:
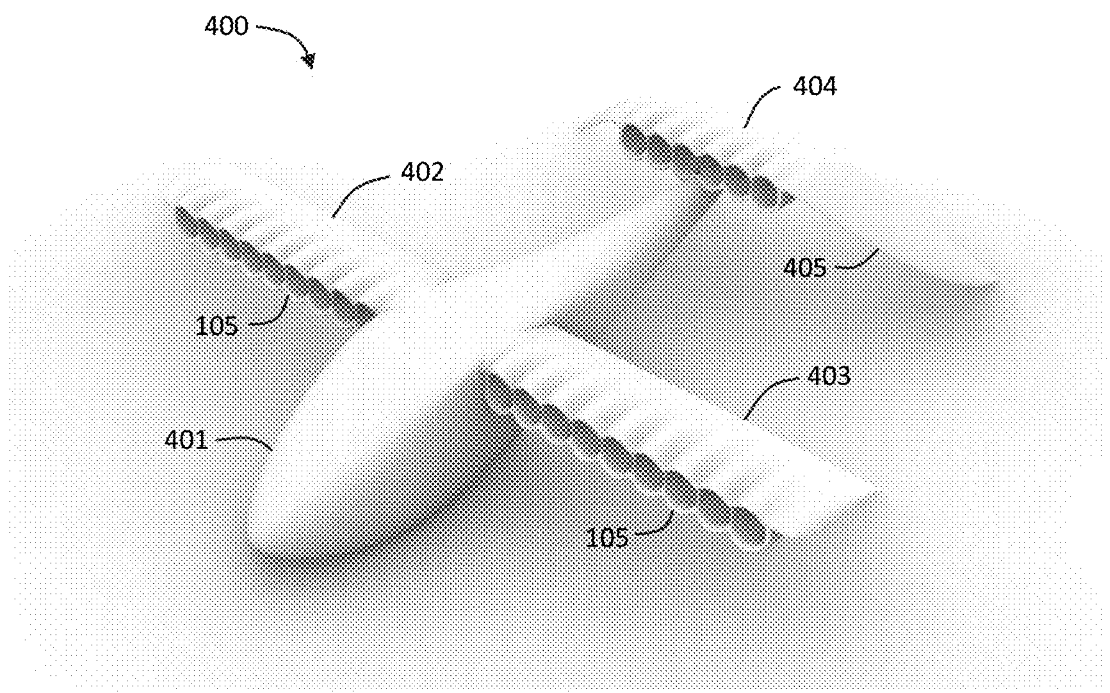
FIGS. 20A-H are views of a second embodiment of an aircraft with a multi-element lifting system with integrated propulsion according to some embodiments of the present invention.
Figure 20B:
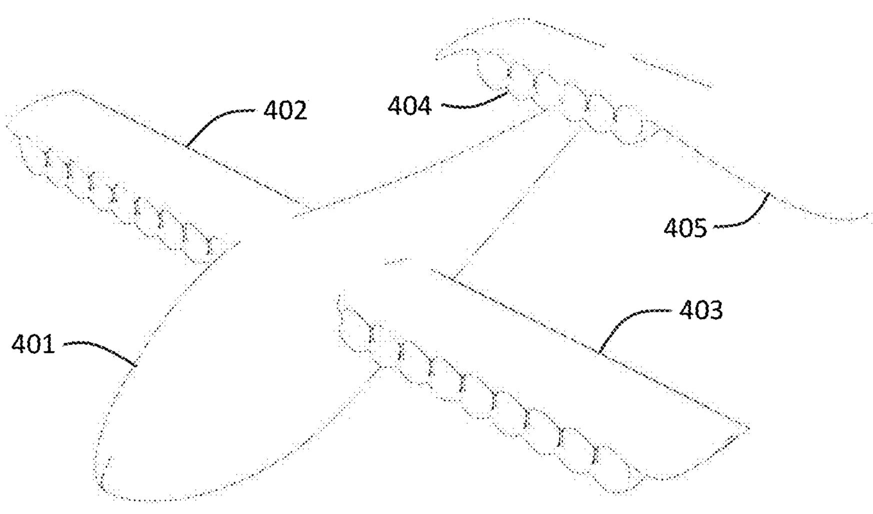
Figure 20C:
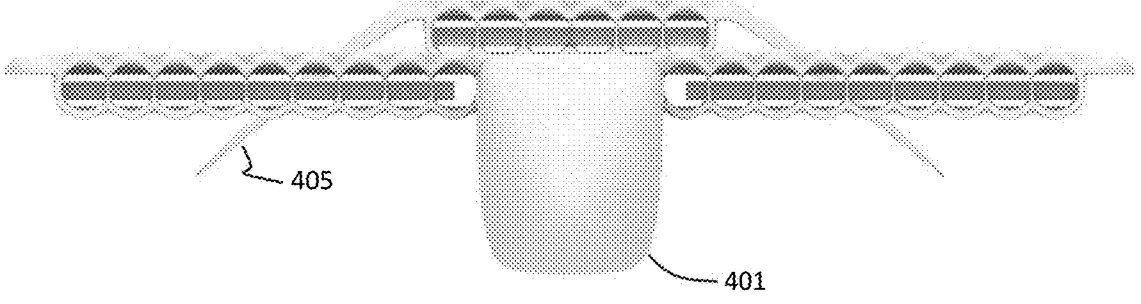
Figure 20D:
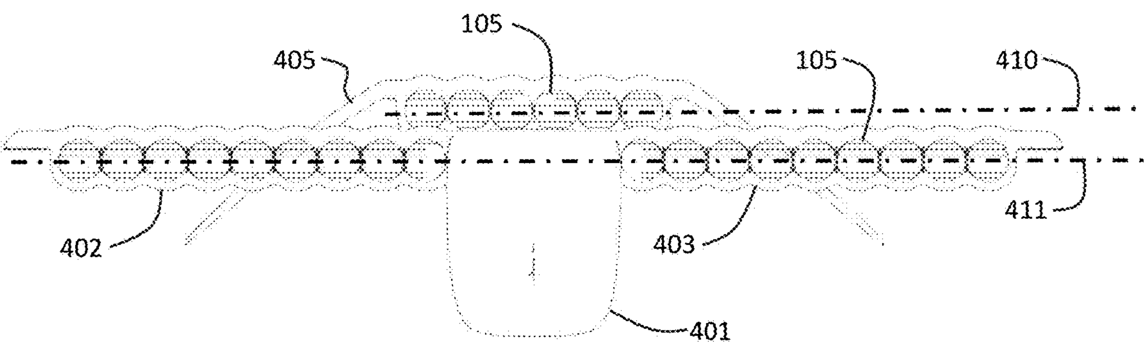
Figure 20E:
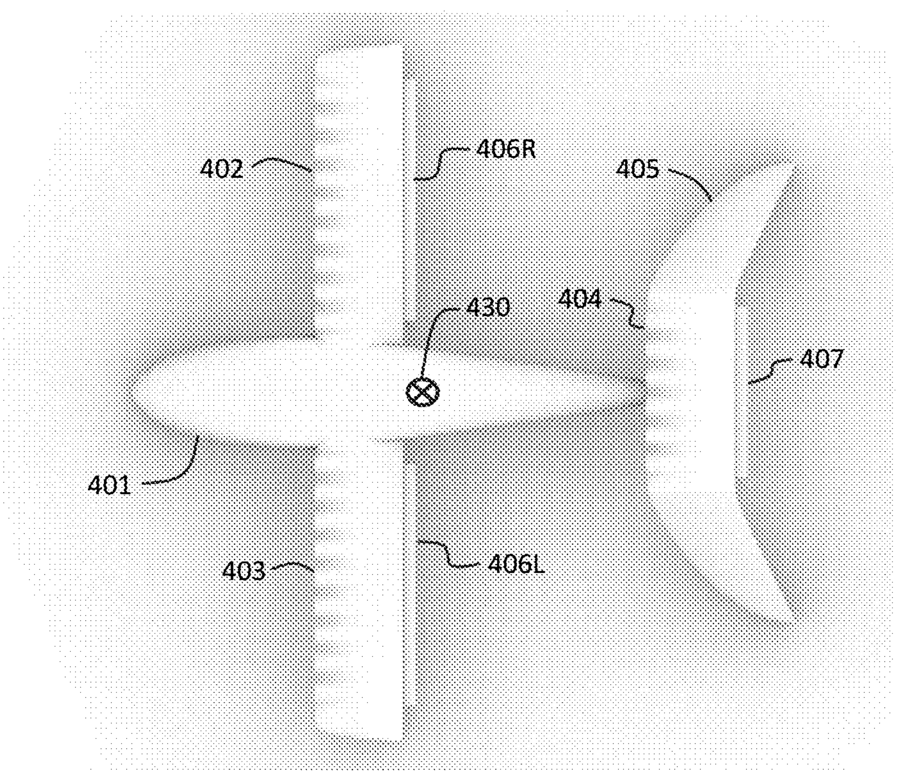
Figure 20F:
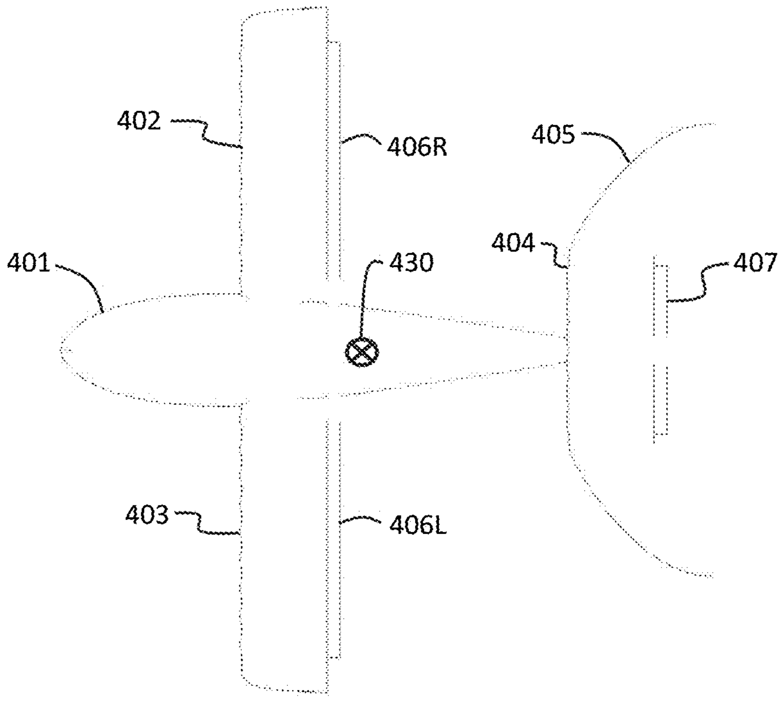
Figure 20G:
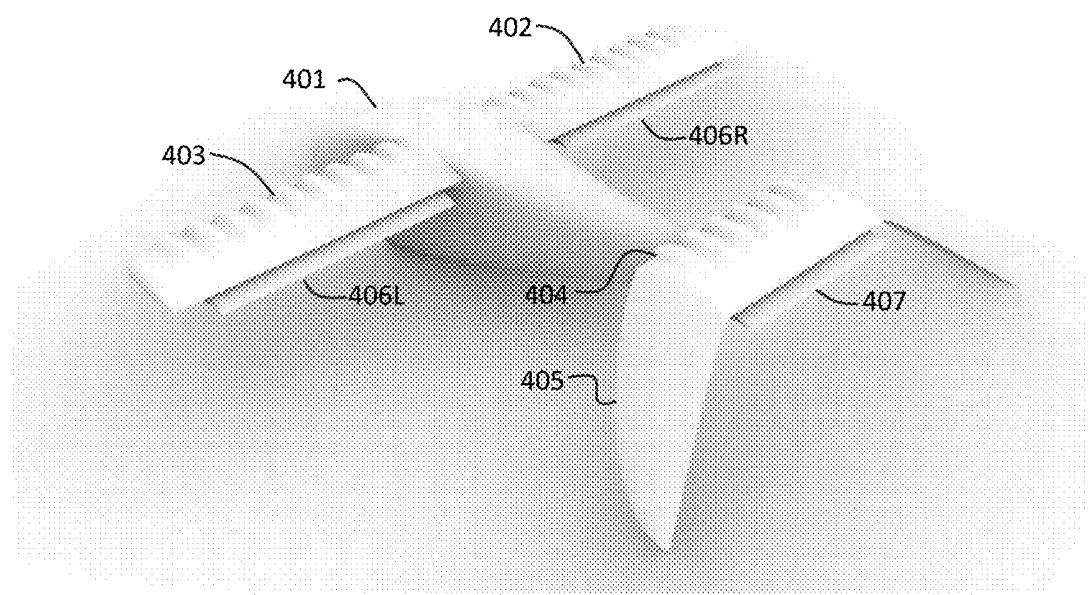
Figure 20H:
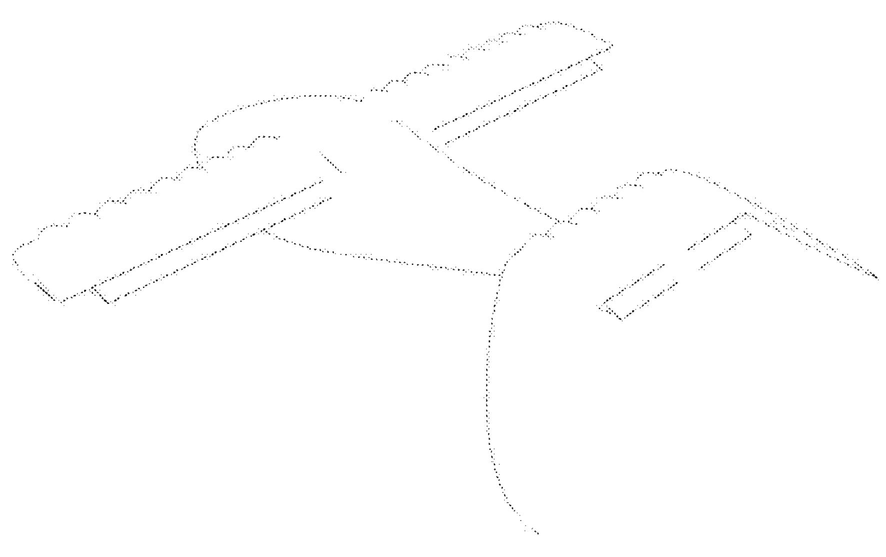

The right wing assembly 402 of the aerial vehicle 400 has a control wing segment 406R which can be seen extending rearward from the upper wing element of the wing assembly, in FIG. 20E, for example. The left wing assembly 403 of the aerial vehicle 400 has a control wing segment 406L which can be seen extending rearward from the upper wing element of the wing assembly. The right wing assembly 402 and the left wing assembly 403 have a plurality of front openings 105. Airflow through the front opening 105 will flow below the upper wing element 101 and above the lower wing element 102. The motor 113 rotates a thrust element, with the disc plane 114 rearward of the front opening 105. The front opening 105 may be substantially circular, while the rear exit area may be substantially rectangular, or square. The control wing elements 406R, 406L may reside in a forward flight position during forward flight, during which the control wing element may be in a horizontal orientation. The control wing elements are adapted to transition through intermediate positions, and out to a vertical take-off and landing position during hover flight, during which the control wing element may be deflecting the airstream into a substantially vertical, downward, direction.

The rear wing assembly 404 of the aerial vehicle 400 has a control wing segment 407 which can be seen extending rearward from the upper wing element of the rear wing assembly, in FIG. 20E, for example. Airflow through the front opening 105 will flow below the upper wing element 101 and above the lower wing element 102. The motor 113 rotates a thrust element, with the disc plane 114 rearward of the front opening 105. The front opening 105 may be substantially circular, while the rear exit area may be substantially rectangular, or square. The control wing element 407 may reside in a forward flight position during forward flight, during which the control wing element may be in a horizontal orientation. The control wing element is adapted to transition through intermediate positions, and out to a vertical take-off and landing position during hover flight, during which the control wing element may be deflecting the airstream into a substantially vertical, downward, direction.

The aerial vehicle center of mass 430 resides between the front wing assembly and the rear wing assembly, allowing for control of the aerial vehicle during VTOL hover operations.

As can be seen in side view in FIG. 20D, the nominal airflow elevation 411 through the front wing assembly 402, 403 is at a different elevation than the nominal airflow elevation 410 through the rear wing assembly 404. In this illustrative embodiment, the nominal airflow elevation 410 through the rear wing assembly 404 is higher than that of the front wing assembly.

In some embodiments of the present invention, as seen in FIGS. 21A-M, an aerial vehicle 500 has a vehicle main body has a front wing assembly coupled to a front portion of the aerial vehicle 500. The front wing assembly has a front right side wing assembly 502 and a front left side wing assembly 503. The front right side wing assembly 502 uses the multi-element lifting system and is coupled to the vehicle main body 501. The front left side wing 503 uses the multi-element lifting system and is coupled to the vehicle main body 501. The aerial vehicle also has a rear wing assembly with a rear right wing assembly 522 and a rear left wing assembly 523. The multi-element lifting systems may take on the function of wings on the aerial vehicle, with internal airflow from thrust elements in each of the wing segments. A control wing segment resides near the rear of each system/wing, as described above. In some aspects, there may be other control features or thrust units on the aerial vehicle.

Figure 21A:
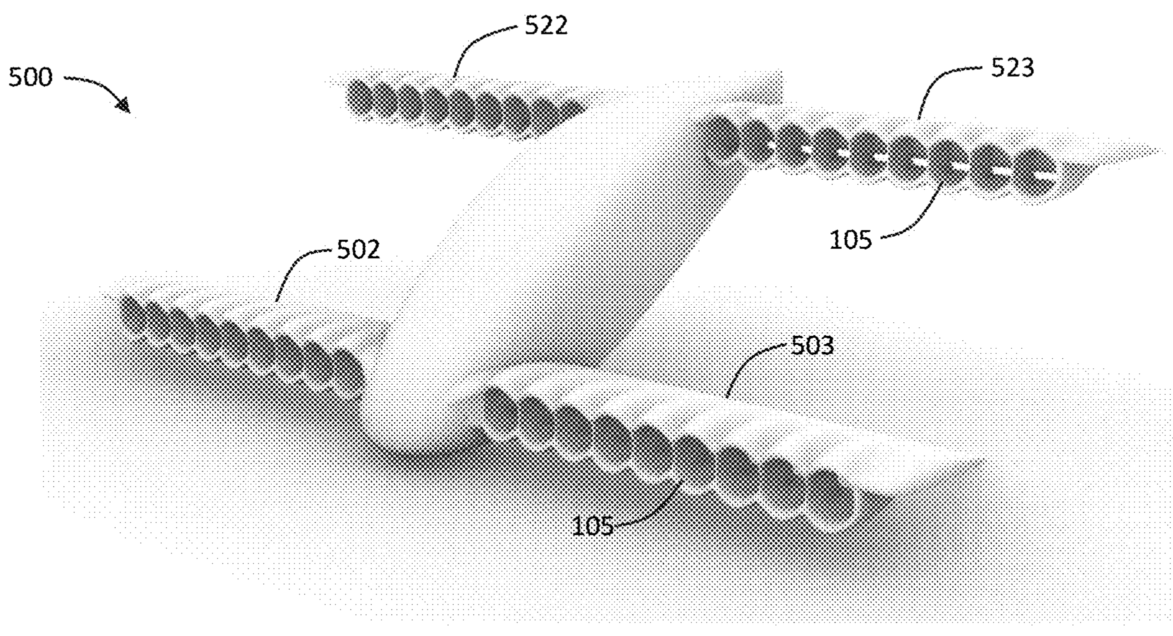
FIGS. 21A-M are views of a third embodiment of an aircraft with a multi-element lifting system with integrated propulsion according to some embodiments of the present invention.
Figure 21B:
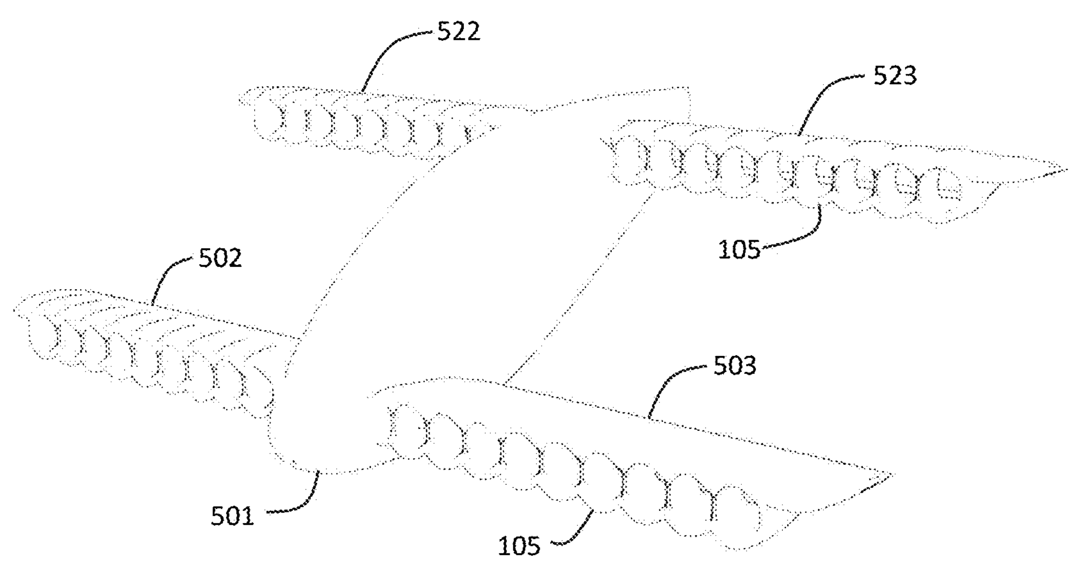
Figure 21C:
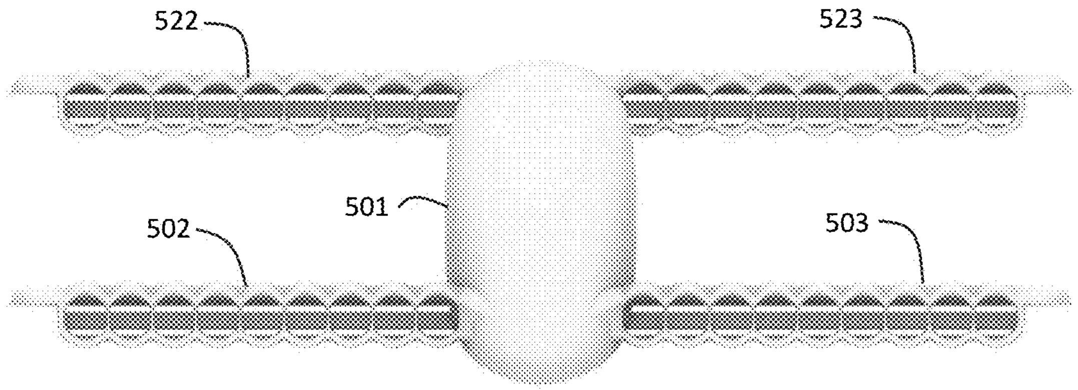
Figure 21D:
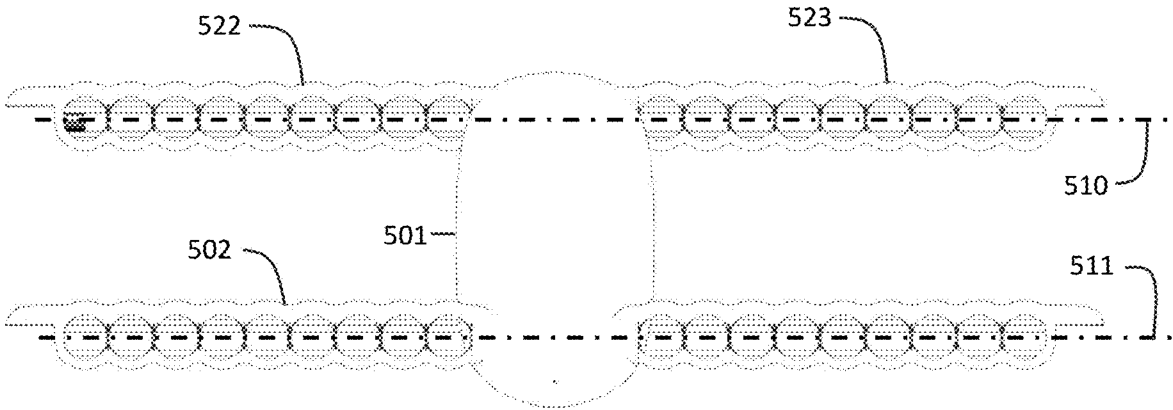
Figure 21E:
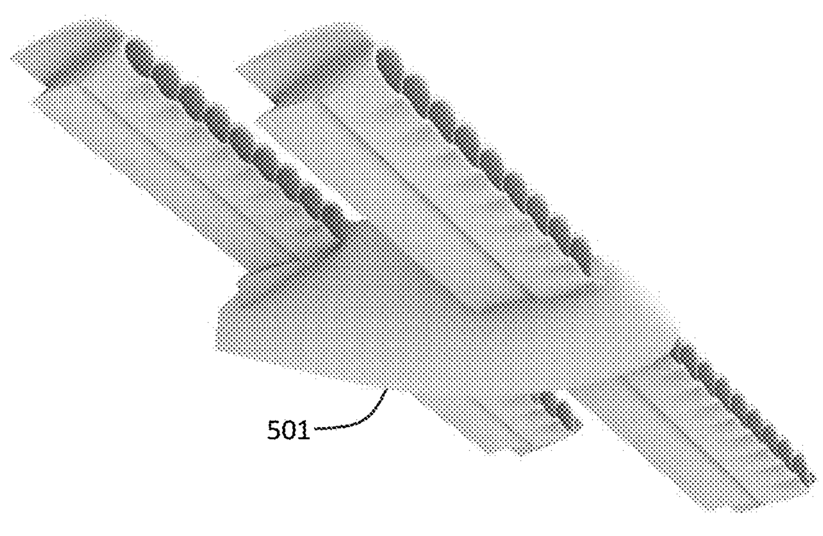
Figure 21F:
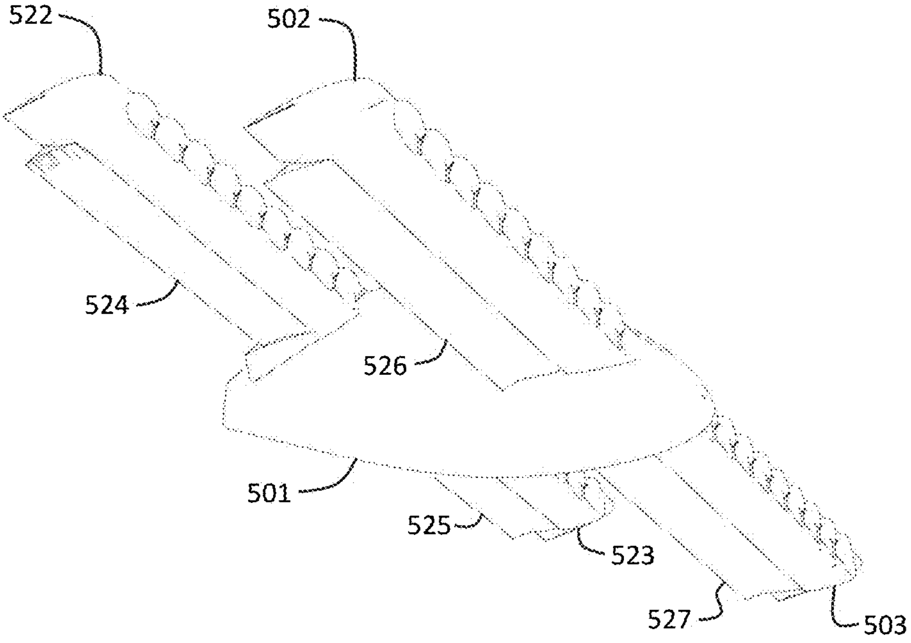
Figure 21G:
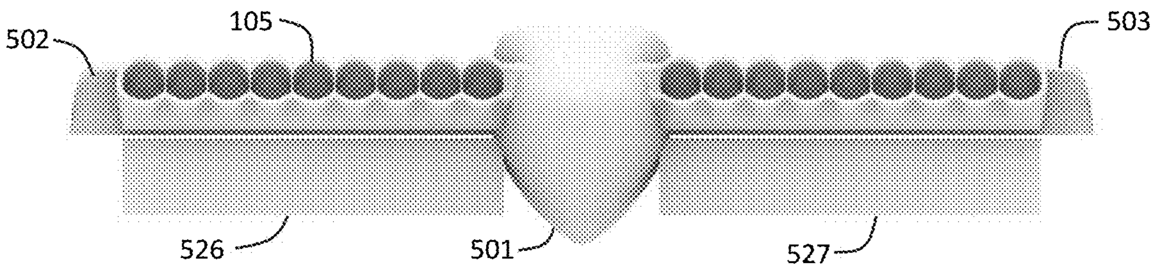
Figure 21H:
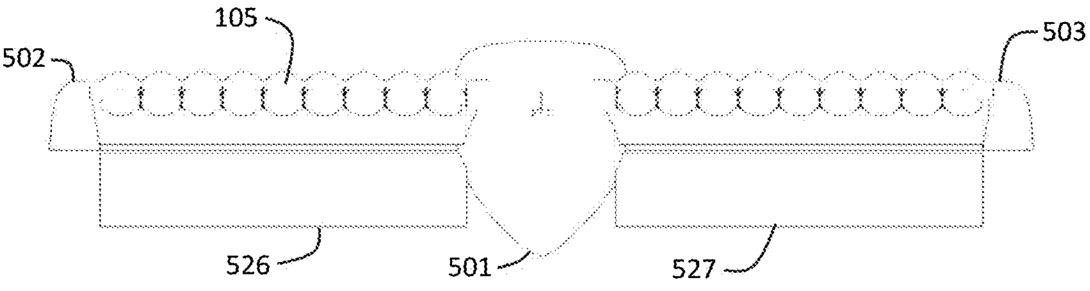
Figure 21I:
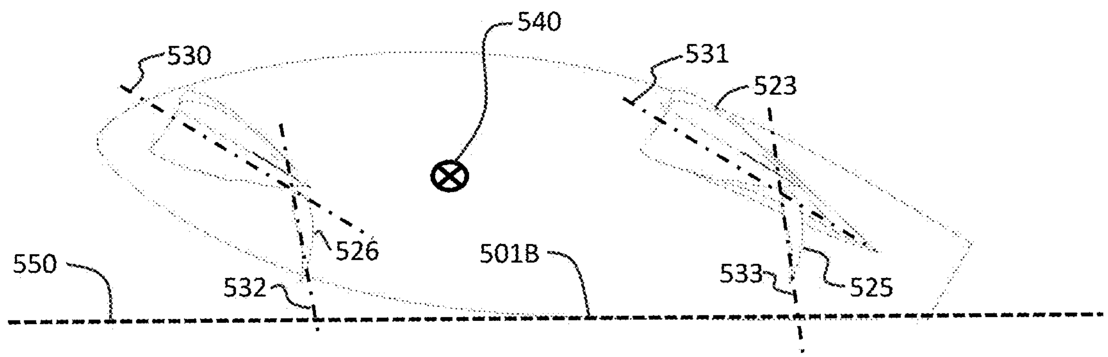
Figure 21J:
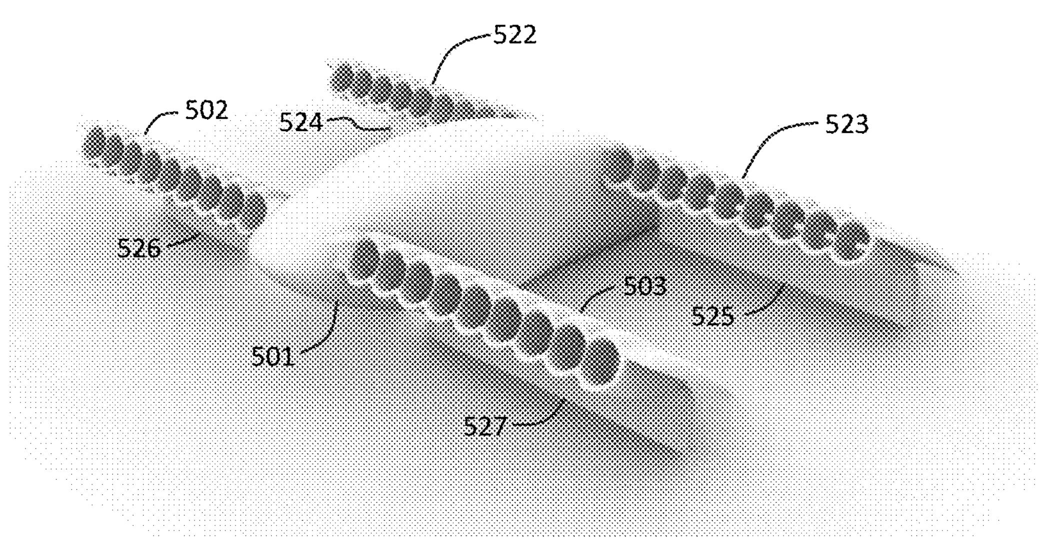
Figure 21K:
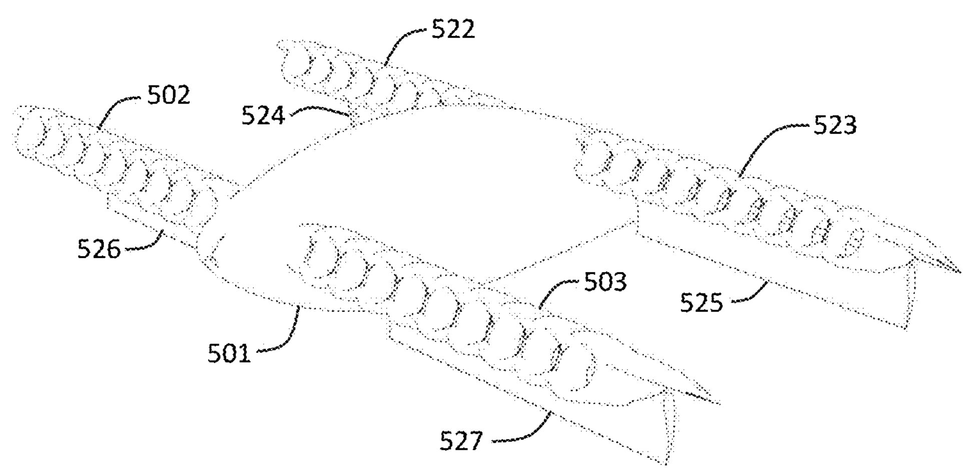
Figure 21L:
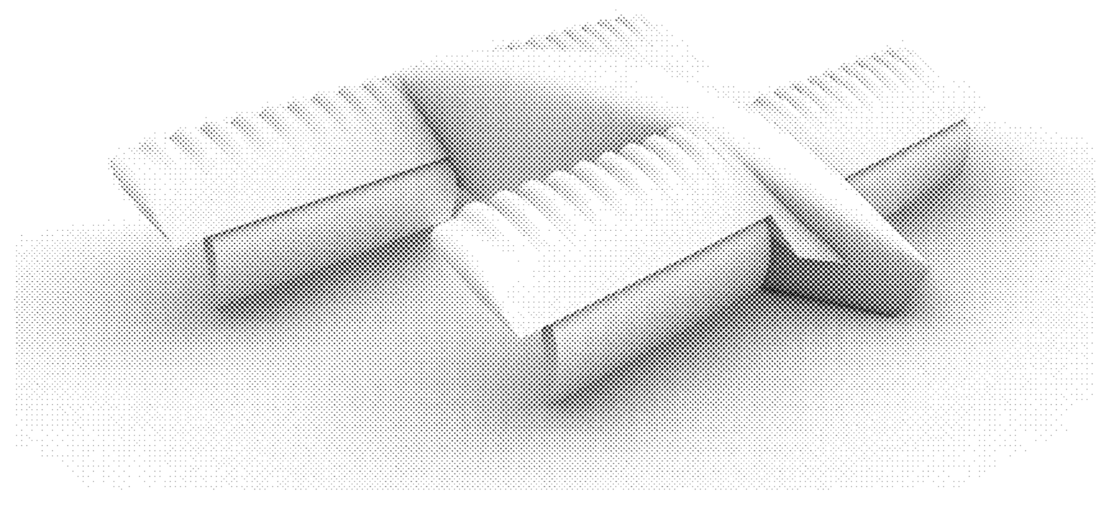
Figure 21M:
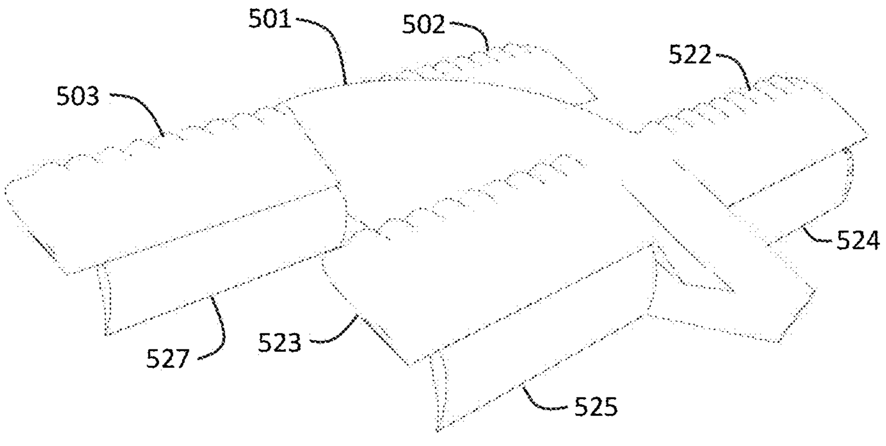

The front right wing assembly 502 of the aerial vehicle 500 has a control wing segment 526 which can be seen extending rearward from the upper wing element of the wing assembly, in FIG. 21F, for example. The front left wing assembly 503 of the aerial vehicle 500 has a control wing segment 527 which can be seen extending rearward from the upper wing element of the wing assembly. The rear right wing assembly 522 of the aerial vehicle 500 has a control wing segment 524. The rear left wing assembly 523 of the aerial vehicle 500 has a control wing segment 525 which can be seen extending rearward from the upper wing element of the wing assembly. The wing assemblies have a plurality of front openings 105. Airflow through the front opening 105 will flow below the upper wing element 101 and above the lower wing element 102. The motor 113 rotates a thrust element, with the disc plane 114 rearward of the front opening 105. The front opening 105 may be substantially circular, while the rear exit area may be substantially rectangular, or square. The control wing elements may reside in a forward flight position during forward flight, during which the control wing element may be in a horizontal orientation. The control wing elements are adapted to transition through intermediate positions, and out to a vertical take-off and landing position during hover flight, during which the control wing element may be deflecting the airstream into a substantially vertical, downward, direction.

The aerial vehicle center of mass 540 resides between the front wing assembly and the rear wing assembly, allowing for control of the aerial vehicle during VTOL hover operations.

As can be seen in side view in FIG. 21D, the nominal airflow elevation 511 through the front wing assembly 502, 503 is at a different elevation than the nominal airflow elevation 510 through the rear wing assembly 522, 523. In this illustrative embodiment, the nominal airflow elevation 510 through the rear wing assembly 510 is higher than that of the front wing assembly.

The aerial vehicle 500 is adapted for horizontal nominal forward flight as seen in front view in FIGS. 21C and 21D, for example. However, for hover during VTOL operations, the aerial vehicle 500 will pitch up so that front wing assembly and the rear wing assembly align in elevation. FIG. 211 illustrates the hover configuration in side view. The aerial vehicle 500 may land on the ground 550 such that the bottom surface 501B resides on the ground, or is suspended with landing struts or gear. In the nominal forward flight configuration, the main body 501 of the aerial vehicle 500 slopes upward along an underside 501B rearward along the longitudinal axis of the aerial vehicle.

FIG. 21I and FIGS. 21J-M further illustrates aspects of the pitched up, relative to horizontal forward flight, hover configuration of the aerial vehicle 500. In this hover configuration, the airflow 530 into the wing segments 104 of the front wing assembly enters into from an angle higher from the ground, minimizing the possibility of ingesting debris which may be kicked up by the thrust deflected downward by the front control elements 526, 527. Similarly, the airflow 531 into the wing segments 104 of the rear wing assembly enters into from an angle higher from the ground, minimizing the possibility of ingesting debris which may be kicked up by the thrust deflected downward by the rear control elements 524, 525. Also, the front control elements 526, 527 do not need to deploy to a full 90 degree position from the horizontal flight configuration, which may simplify the requirements of the deployment mechanisms for the control elements. Similarly, rear control elements 524, 525 do not need to deploy to a full 90 degree position from the horizontal flight configuration, which may simplify the requirements of the deployment mechanisms for the control elements.

Figure 22:
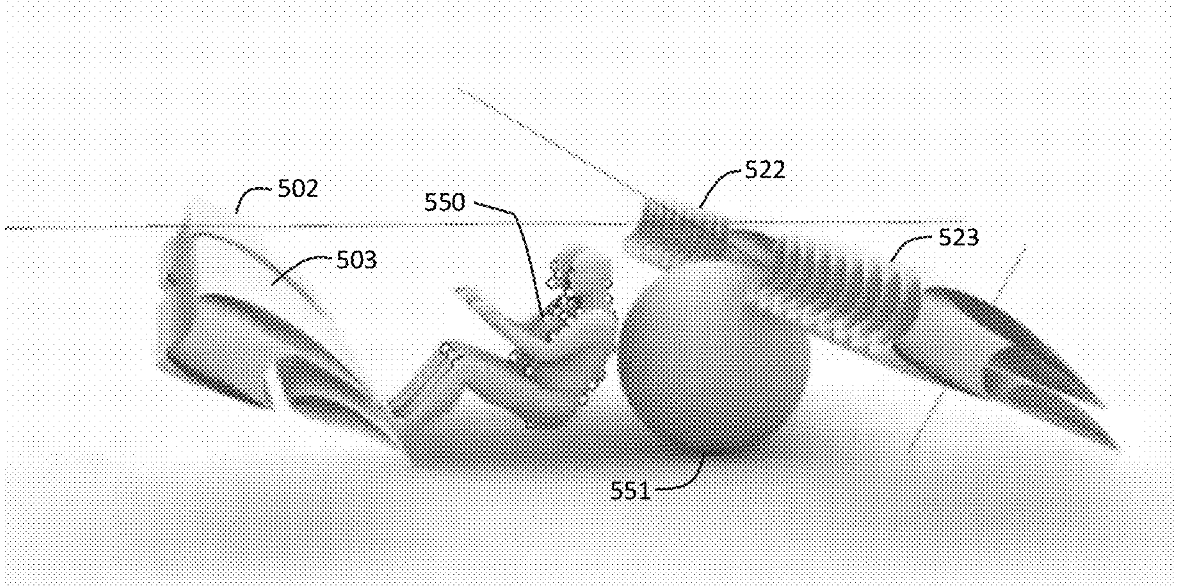
FIG. 22 is a view of a passenger compartment of a third embodiment of an aircraft with a multi-element lifting system with integrate propulsion according to some embodiments of the present invention.
Figure 23A:
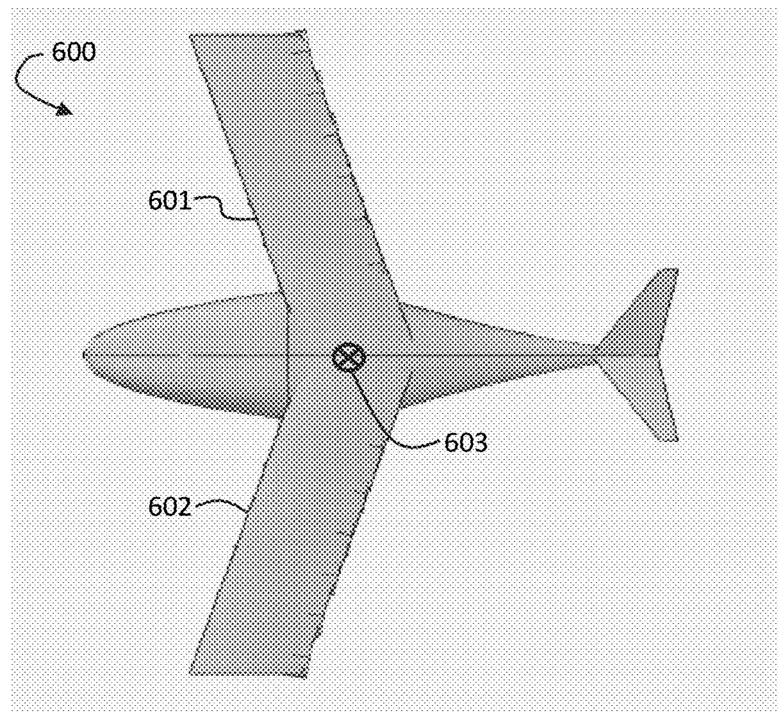
FIGS. 23A-D are views of a third embodiment of an aircraft with a multi-element lifting system with integrated propulsion according to some embodiments of the present invention.
Figure 23B:
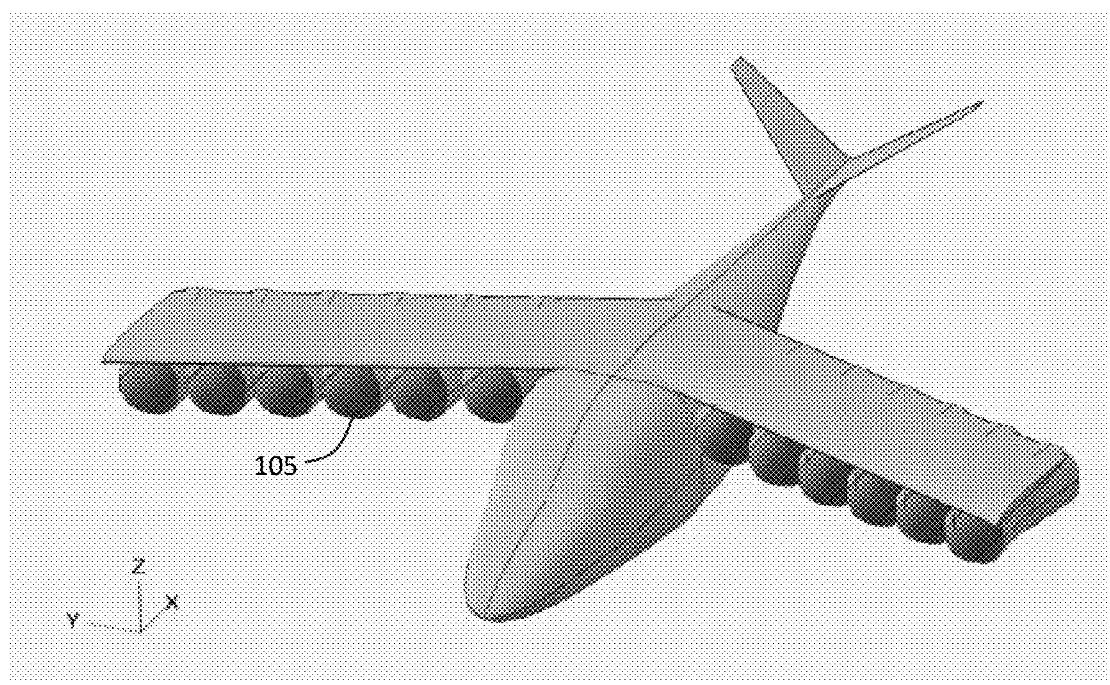
Figure 23C:
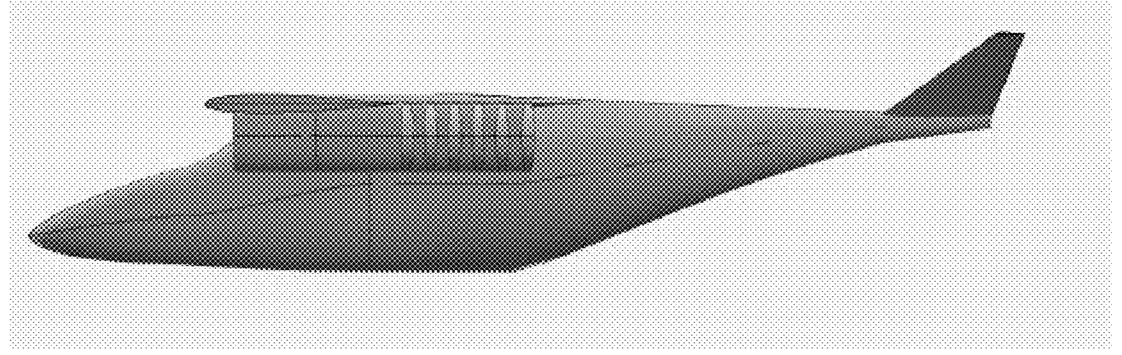
Figure 23D:
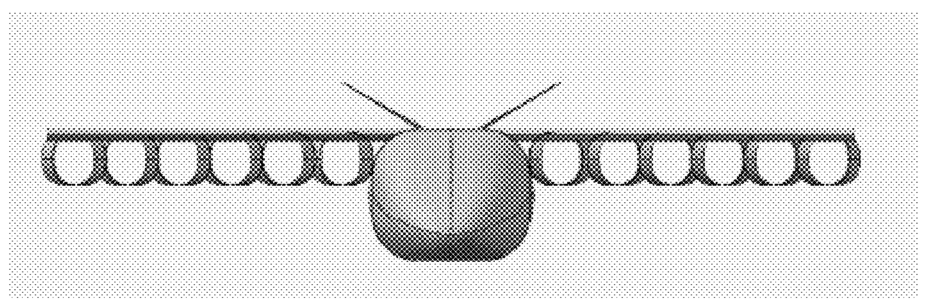

In some embodiments of the present invention, as seen in FIG. 22, aspects of the interior of the aerial vehicle 500 include passengers 550 and a fuel tank 551, which may be a hydrogen fuel tank. The front wing assemblies 502, 503 and the rear wing assemblies 522, 523 are illustrated pitched up, as would be seen with the aerial vehicle 500 on the ground.

The thrust units together with control wing segment deflections allow for variation of both the magnitude as well as direction of thrust in all flight regimes. Furthermore, even in absence of thrust, in forward flight, the movement of the control wing segment affects the lift on that wing section in the way a traditional control surface on an aircraft does. This allows for aircraft to have full control of all angular axes of flight without additional control elements. In some aspects, the aerial vehicle 300, 400, 500 does not have controllable control elements other than the control wing segments.

In hover, changing the angle of the control wing segments will change the direction of thrust. This allows for yaw control in hover. Differential thrust along the longitudinal axis allows for pitch control, differential thrust along the lateral axis for roll control. Collective movement of the control wing segments will create a forward/rearward thrust that allows the aircraft to accelerate/decelerate, and this can be combined with overall aircraft pitching motion close to hover to achieve acceleration/deceleration.

In forward flight, differential control wing segment deflection along the longitudinal axis creates a longitudinal distribution of lift that gives pitch control. Differential control wing segment deflection along the lateral axes creates a lift distribution gives roll control. Thrust distribution along the lateral axis gives yaw control. For regimes of flight between hover and forward flight, a blend of the above strategies is effective.

A full characterization of sectional duct aerodynamic lift and wind aligned drag/thrust as a function of forward speed, control wing segment deflection, fan pressure (as it relates to dynamic pressure), local angle of attack can be generated using computational fluid dynamics or wind tunnel tests. Such analyses can also be performed for the complete vehicle. Using that information, control strategies as well as overall aircraft trim strategies in all regimes of flight can be optimized based on the specific characteristics of the system. Those strategies can be similar to the ones described above, or can be different.

In some aspects, a method for flying an aerial vehicle, wherein said aircraft comprises:

a first wing assembly, said first wing assembly comprising:
- an upper wing element;
- a lower wing element, said lower element residing below said upper wing element;
- a plurality of airflow segments, said airflow segments coupled to said upper wing element on an upper end, said airflow segments coupled to said lower wing segment on a lower end;
- a plurality of thrust elements, said thrust elements residing in said airflow segments; and
- one or more control wing segments, said control wing segments deployable from a forward flight configuration to a vertical flight configuration, said control wing segments residing below said upper wing element and rearward of said lower wing element, said method comprising the steps of:
- deploying said one or more control wing segments to a deployed position,
- generating vertical thrust through the use of said plurality of thrust elements by deflecting the thrust downwards with said control wing segments;
- gaining elevation from the ground;
- generating forward speed by beginning to transition said control wing segments from the vertical flight configuration to the forward flight configuration;
- transitioning to forward flight with said control wing segments in the forward flight configuration.

In some aspects, the method would further comprise the step of landing the aircraft, including pitching up of the aircraft to level the front and rear wing assemblies, deploying the control elements to a vertical thrust producing orientation, and landing the aircraft.

As evident from the above description, a wide variety of embodiments may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

What is claimed is:

1. An aerial vehicle comprising a first wing assembly, said first wing assembly comprising:
- an upper wing element;
- a lower wing element, said lower element residing below said upper wing element;
- one or more airflow segments, said airflow segments coupled to said upper wing element on an upper end, said airflow segments coupled to said lower wing segment on a lower end, said airflow segments forming a first airflow passage below said upper wing element and above said lower wing element at a forward end of said airflow segment;

one or more thrust units, each thrust unit residing in an airflow segment; and one or more control wing segments, said control wing segments deployable from a forward flight configuration to a vertical flight configuration, said control wing segments residing below said upper wing element and rearward of said lower wing element, wherein said first airflow passage at the forward end of the airflow segment splits into a second airflow passage above the control wing segment and below the upper wing segment and a third airflow passage below said control wing segment while in a forward flight configuration.

2. The aerial vehicle of claim 1 further comprising an aerial vehicle main body, wherein said first wing assembly is coupled to said aerial vehicle main body.

3. The aerial vehicle of claim 2 wherein said first wing assembly comprises a first right side wing assembly and a first left side wing assembly, said first right side wing assembly and said first left side wing assembly fixedly coupled to said aerial vehicle main body.

4. The aerial vehicle of claim 3 wherein said aerial vehicle further comprises:

an upper spar through the upper wing element of said first right side wing assembly and said first left side wing assembly, said upper spar coupled to said aerial vehicle main body; and a lower spar through the lower wing element of said first right side wing assembly and said first left side wing assembly, said lower spar coupled to said aerial vehicle main body.

5. The aerial vehicle of claim 3 further comprising one or more control segment deployment mechanisms.

6. The aerial vehicle of claim 5 wherein said first wing assembly is forward of the center of mass of the aerial vehicle, and wherein said rear wing assembly is rearward of the center of mass of the aerial vehicle.

7. The aerial vehicle of claim 3 further comprising a tail assembly, said tail assembly comprising a rear wing assembly, said rear wing assembly comprising:

an upper wing element;

a lower wing element, said lower element residing below said upper wing element;

a plurality of airflow segments, said airflow segments coupled to said upper wing element on an upper end, said airflow segments coupled to said lower wing segment on a lower end;

a plurality of thrust units, said thrust units residing in said airflow segments; and one or more control wing segments, said control wing segments deployable from a forward flight configuration to a vertical flight configuration, said control wing segments residing below said upper wing element and rearward of said lower wing element.

8. The aerial vehicle of claim 7 wherein said first wing assembly is coupled to an upper portion of said aerial vehicle main body.

9. The aerial vehicle of claim 3 wherein said rear wing assembly is at a higher elevation than said first wing assembly when said aerial vehicle is in a forward flight configuration.

10. The aerial vehicle of claim 3 wherein said first right side wing assembly and said first left side wing assembly are forward swept, and wherein said first right side wing assembly and said first left side wing assembly are coupled said aerial vehicle main body rearward of the center of mass of the aerial vehicle.

11. The aerial vehicle of claim 10 wherein said first right side wing assembly and said first left side wing assembly are forward swept such that when in a vertical thrust configuration one or more of thrust units are fore of the center of mass of the aircraft and one or more of the thrust units are aft of the center of mass of the aircraft.

12. The aerial vehicle of claim 2 wherein said first wing assembly is coupled to an upper portion of said aerial vehicle main body.

13. The aerial vehicle of claim 1 further comprising one or more control segment deployment mechanisms.

* * * * *